US012749346B2

(12) United States Patent
Benha et al.

(10) Patent No.: US 12,749,346 B2
(45) Date of Patent: Sep. 29, 2026

(54) FINGER ENCODING BASED POSE CLASSIFICATION

(71) Applicant: QUALCOMM Incorporated, San Diego, CA (US)

(72) Inventors: Said Benha, Bordeaux (FR); Thomas Alexandre Dravigney, Bordeaux (FR); Ophir Paz, Floirac (FR); Ludovic Rivalland, Cenon (FR)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 18/622,739

(22) Filed: Mar. 29, 2024

(65) Prior Publication Data

US 2025/0308288 A1 Oct. 2, 2025

(51) Int. Cl.
*G06V 40/20* (2022.01)
*G06V 10/764* (2022.01)
*G06V 10/77* (2022.01)
*G06V 40/10* (2022.01)

(52) U.S. Cl.
CPC ............ *G06V 40/28* (2022.01); *G06V 10/764* (2022.01); *G06V 10/77* (2022.01); *G06V 40/11* (2022.01)

(58) Field of Classification Search
CPC ...... G06V 40/28; G06V 10/764; G06V 10/77; G06V 40/11; G06V 10/82
See application file for complete search history.

(56) References Cited

U.S. PATENT DOCUMENTS

| | | | | |
|---|---|---|---|---|
| 8,570,383 | B2 * | 10/2013 | Klefenz | G06V 40/107 348/222.1 |
| 2008/0089587 | A1 * | 4/2008 | Kim | G06F 3/0304 382/190 |
| 2011/0234384 | A1 * | 9/2011 | Agrawal | H04Q 9/00 340/10.5 |
| 2016/0203360 | A1 * | 7/2016 | Alvarez | G06V 40/28 345/156 |
| 2020/0250409 | A1 * | 8/2020 | Hu | G01S 5/0221 |
| 2021/0158031 | A1 * | 5/2021 | Du | G06F 18/2155 |
| 2021/0174519 | A1 * | 6/2021 | Bazarevsky | G06T 7/251 |
| 2023/0333668 | A1 * | 10/2023 | Fish | G06F 3/023 |
| 2024/0265641 | A1 * | 8/2024 | Jeong | G06F 3/0346 |
| 2025/0256569 | A1 * | 8/2025 | Mahmoud | B60K 35/10 |

OTHER PUBLICATIONS

Bernasconi et a, ("A Computational Approach to Hand Pose Recognition in Early Modern Paintings", Journal of imaging, published: Jun. 15, 2023) (Year: 2023).*
Bernasconi V., et al., "A Computational Approach to Hand Pose Recognition in Early Modern Paintings", Journal of Imaging, vol. 9, 120, Published on Jun. 15, 2023, pp. 1-18.

* cited by examiner

*Primary Examiner* — Amara Abdi
(74) *Attorney, Agent, or Firm* — Polsinelli LLP/QUALCOMM Incorporated

(57) ABSTRACT

Systems and techniques are described for image processing. For example, a computing device can encode one or more fingers of five fingers of a hand with a code, wherein the code corresponds to a position associated with the one or more fingers making the hand gesture. The computing device can determine a classification for the hand gesture, wherein the classification comprises the code associated with the one or more fingers of the hand.

20 Claims, 17 Drawing Sheets

FINGER ENCODING BASED POSE CLASSIFICATION

FIELD

The present disclosure generally relates to image processing. For example, aspects of the present disclosure relate to finger encoding based pose classification.

BACKGROUND

The increasing versatility of digital camera products has allowed digital cameras to be integrated into a wide array of devices and has expanded their use to different applications. For example, phones, drones, cars, computers, televisions, and many other devices today are often equipped with camera devices. The camera devices allow users to capture images and/or video (e.g., including frames of images) from any system equipped with a camera device. The images and/or videos can be captured for recreational use, professional photography, surveillance, and automation, among other applications. In some cases, the sequence of image frames can be processed for performing one or more functions, can be output for display, can be output for processing and/or consumption by other devices, among other uses.

Devices (e.g., mobile devices) and systems are increasingly leveraging hand tracking systems that utilize images (e.g., captured by camera devices) for tracking hand gestures. Pose classification is one of the most important algorithms in a hand tracking system (e.g., because pose classification can be used to understand what a user is doing to be able to create some interactions with a virtual environment). Pose classification can be used in runtime to classify a pose of a hand (e.g., a hand gesture). In the modern state-of-the-art systems, heuristics or machine learning models are often employed to classify traditional hand gestures, such as pinch, grab, and open hand gestures.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for performing finger encoding based pose classification. According to at least one example, an apparatus for classifying a hand gesture is provided. The apparatus includes at least one memory and at least one processor coupled to the at least one memory and configured to: encode one or more fingers of five fingers of a hand with a code, wherein the code corresponds to a position associated with the one or more fingers making the hand gesture; and determine a classification for the hand gesture, wherein the classification comprises the code associated with the one or more fingers of the hand.

In another illustrative example, a method is provided for classifying a hand gesture. The method includes: encoding, by one or more processors, one or more fingers of five fingers of a hand with a code, wherein the code corresponds to a position associated with the one or more fingers making the hand gesture; and determining, by the one or more processors, a classification for the hand gesture, wherein the classification comprises the code associated with the one or more fingers of the hand.

In another illustrative example, a non-transitory computer-readable medium is provided having stored thereon instructions that, when executed by one or more processors, cause the one or more processors to: encode one or more fingers of five fingers of a hand with a code, wherein the code corresponds to a position associated with the one or more fingers making the hand gesture; and determine a classification for the hand gesture, wherein the classification comprises the code associated with the one or more fingers of the hand.

In another illustrative example, an apparatus for classifying a hand gesture is provided. The apparatus includes: means for encoding one or more fingers of five fingers of a hand with a code, wherein the code corresponds to a position associated with the one or more fingers making the hand gesture; and means for determining a classification for the hand gesture, wherein the classification comprises the code associated with the one or more fingers of the hand.

Aspects generally include a method, apparatus, system, computer program product, non-transitory computer-readable medium, user device, user equipment, wireless communication device, and/or processing system as substantially described with reference to and as illustrated by the drawings and specification.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
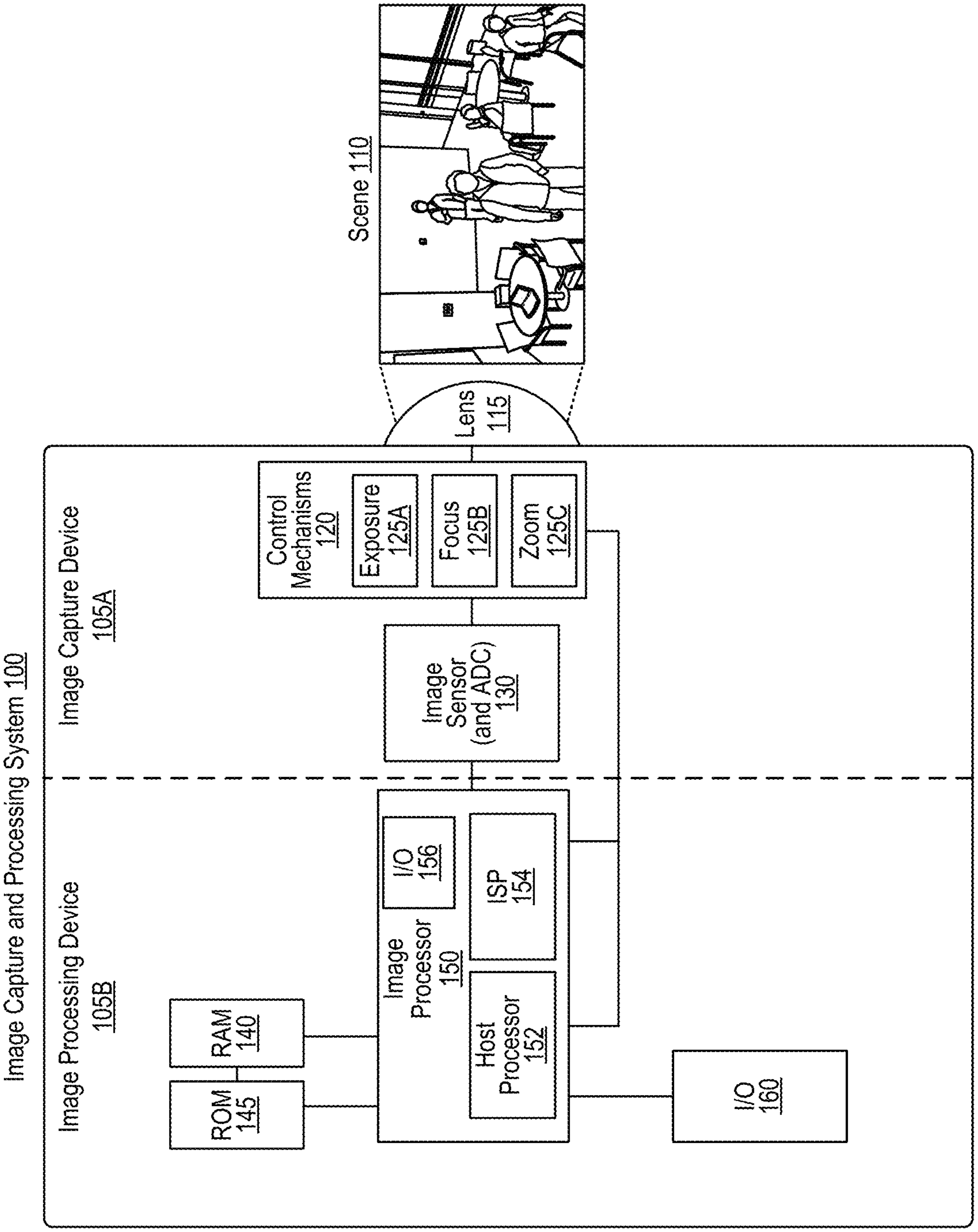
FIG. 1 is a block diagram illustrating an architecture of an image capture and processing system, in accordance with aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

As previously mentioned, devices (e.g., mobile devices, such as XR devices) and systems are increasingly leveraging hand tracking systems that utilize images for tracking hand gestures. Pose classification is an important algorithms in a hand tracking system (e.g., because pose classification can be used to understand what a user is doing to be able to create some interactions with a virtual environment). Pose classification may be used in runtime to classify a pose of a hand (e.g., a hand gesture). In the modern state-of-the-art systems, heuristics or machine learning models (e.g., along with manually annotated classes) are typically employed to classify traditional hand gestures (e.g., pinch, grab, and open hand gestures).

Due to the limitations of the current state-of-the-art methods, effective classification of inter-gestures (e.g., hand gestures that are other than traditional hand gestures and/or are in between traditional hand gestures) can be challenging. Consequently, creating flexible gestures and dynamic motion gestures, such as smoothly transitioning from an inter-gesture to a traditional hand gesture, is not possible with these methods. Furthermore, this limitation of not being able to create flexible gestures or dynamic motion gestures can restrict the ability to effectively meet new user experience (UX) requirements and demands. Additionally, a potential ambiguity issue can exist between two hand gestures, such as a pinch gesture and a pincer gesture, which are often indistinguishable from each other by most current methods.

As such, improved systems and techniques that provide an effective classification of hand gestures, including both traditional hand gestures and inter-gestures, can be beneficial.

In one or more aspects, systems, apparatuses, processes (also referred to as methods), and computer-readable media (collectively referred to herein as "systems and techniques") are described herein for providing finger encoding based pose classification. In one or more examples, the systems and techniques provide a hand pose classification model based on finger encoding. In one or more examples, the systems and techniques employ an encoding mechanism that captures the iterative transition dynamics between different finger states (e.g., open and closed finger states), with the option to choose the number of iterations (e.g., number of different finger positions). The model can utilize three-dimensional (3D) keypoints of the hand, and can predict for each finger the value of the transition. The creation of traditional hand gestures and inter-gestures can be simplified by utilizing this encoding model. The creation of flexible hand gestures is also possible and simple with the utilization of this model with regular expressions. Transitioning from an inter-gesture to another hand gesture can be a consistent way to detect dynamic hand gesture motions. The disclosed model can meet UX requirements and demands for any needed new hand gesture. The model can also be applied for classifying datasets. For example, for quality assurance (QA) datasets, the model can be used to analyze test results effectively. For training datasets, the model can be employed to achieve proper balancing and enhancement.

In one or more aspects, the systems and techniques provide a hand pose classification model based on fingers encoding that uses an encoding mechanism that captures iterative transition dynamics between different finger states (e.g., open and closed finger states or positions) with a number of iterations (e.g., a number of different finger states or positions). The encoding method can flexibly create many different new hand gestures. The transition from an inter-gesture to another hand gesture can be captured by the method. A new hand gesture (e.g., an inter-gesture) can also be captured by using this encoding method. The systems and techniques can also use a temporal state change to represent a hand gesture (e.g., a pinch gesture may be defined by a sequence of codes occurring in a certain specific order).

In one or more aspects, during operation of the systems and techniques for classifying a hand gesture, one or more processors (e.g., of a device, such as a mobile device, for example an XR device) can encode one or more fingers of five fingers of a hand with a code. In one or more examples, the code can correspond to a position (or state) associated with the one or more fingers making the hand gesture. In some examples, the code can include a number for each of the one or more fingers. In one or more examples, the position can be a first finger position, a second finger position, or a third finger position. In some examples, the first finger position can be an open finger position, the third finger position can be a closed finger position, and the second finger position (e.g., an intermediate finger position) can be between the first finger position (e.g., the open finger position) and the second finger position (e.g., the closed finger position). The one or more processors can then determine a classification for the hand gesture. In some examples, the classification can include the code associated with the one or more fingers of the hand.

In one or more examples, the one or more processors can receive an image of the hand making the hand gesture. The one or more processors can determine the code corresponding to the one or more fingers of the hand. The one or more processors can determine the classification of the hand gesture, where the classification can include the code. The one or more processors can then perform a function (e.g., an XR function) based on the classification of the hand gesture.

In some examples, the hand gesture can be an inter-gesture that occurs in between a first hand gesture and a second hand gesture based on the hand transitioning in motion from the first hand gesture to the second hand gesture. In one or more examples, the one or more processors can further determine a dynamic hand gesture, based on occurrence of the first hand gesture, the inter-gesture, and the second hand gesture (e.g., occurring within a certain order).

In one or more examples, the one or more processors can determine the classification for the hand gesture based on a model. In some examples, the model can be trained based on a plurality of hand models with 3D keypoints associated with the classification for the hand gesture. In one or more examples, the model can be a self-supervised machine learning model.

Additional aspects of the present disclosure are described in more detail below.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 15:
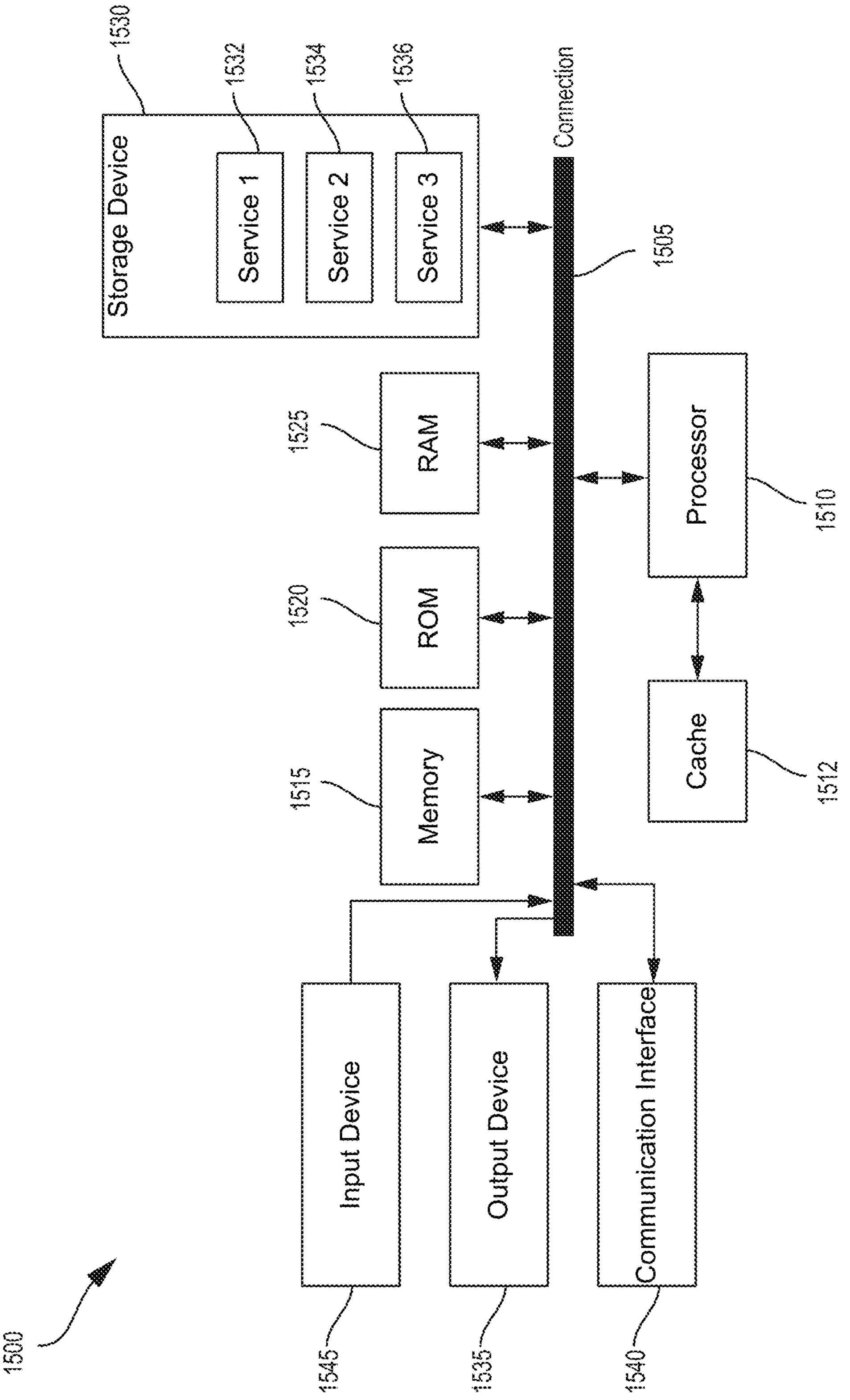
FIG. 15 is a diagram illustrating an example of a system for implementing certain aspects described herein.

The image processor 150 may include one or more processors, such as one or more image signal processors (ISPs) (including ISP 154), one or more host processors (including host processor 152), and/or one or more of any other type of processor 1510 discussed with respect to the computing system 1500 of FIG. 15. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
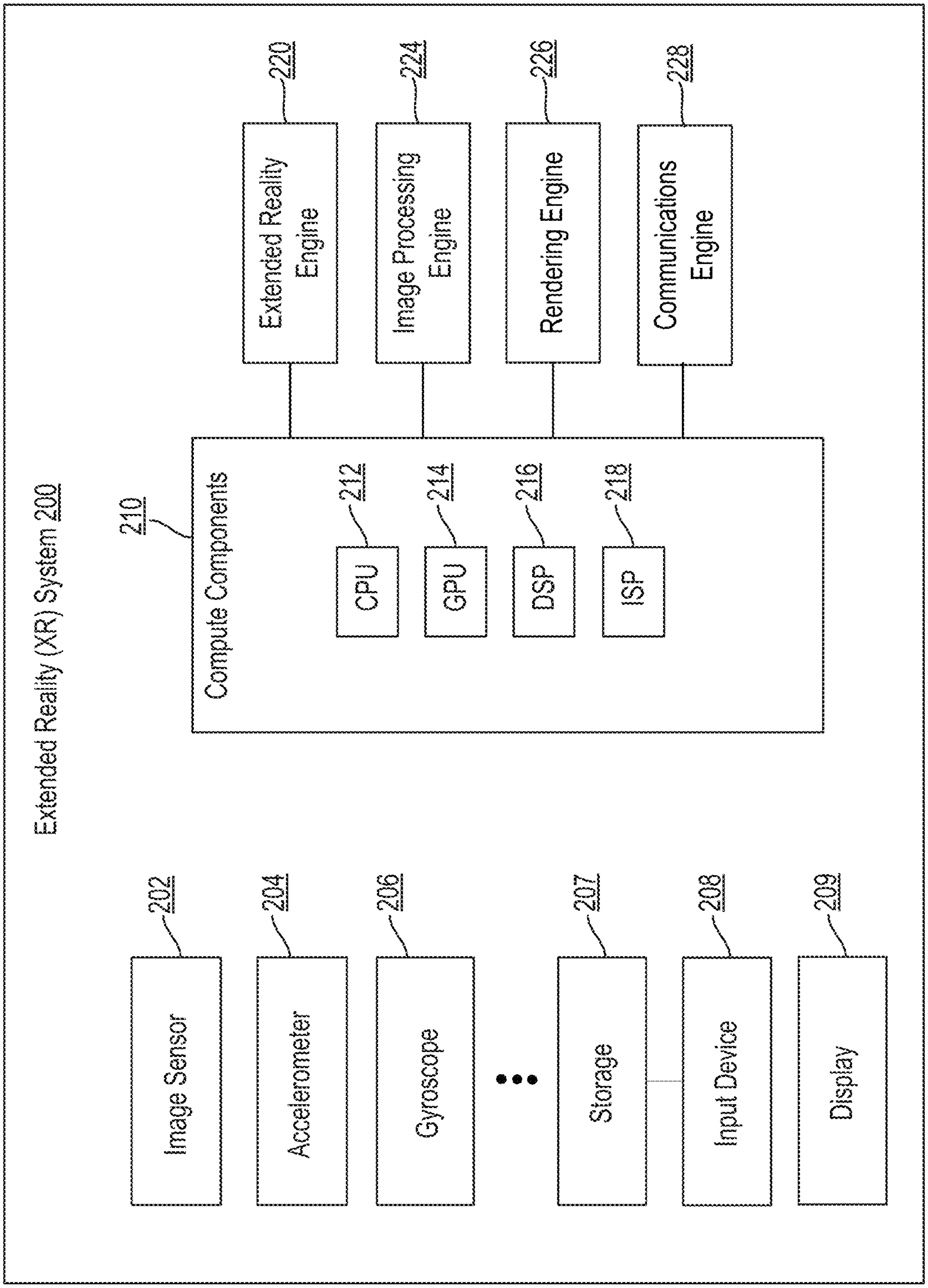
FIG. 2 is a diagram illustrating an architecture of an example extended reality (XR) system, in accordance with some aspects of the disclosure.

In one or more aspects, the systems and techniques may be applied to any system that can process hand gestures. In one or more examples, one such system may be an extended realty (XR) system. FIG. 2 is a diagram illustrating an architecture of an example XR system 200, in accordance with some aspects of the disclosure. In some examples, the extended reality (XR) system 200 of FIG. 2 can include the image capture and processing system 100, the image capture device 105A, the image processing device 105B, or a combination thereof. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one or more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1540 of FIG. 15.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or keypoints associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3A:
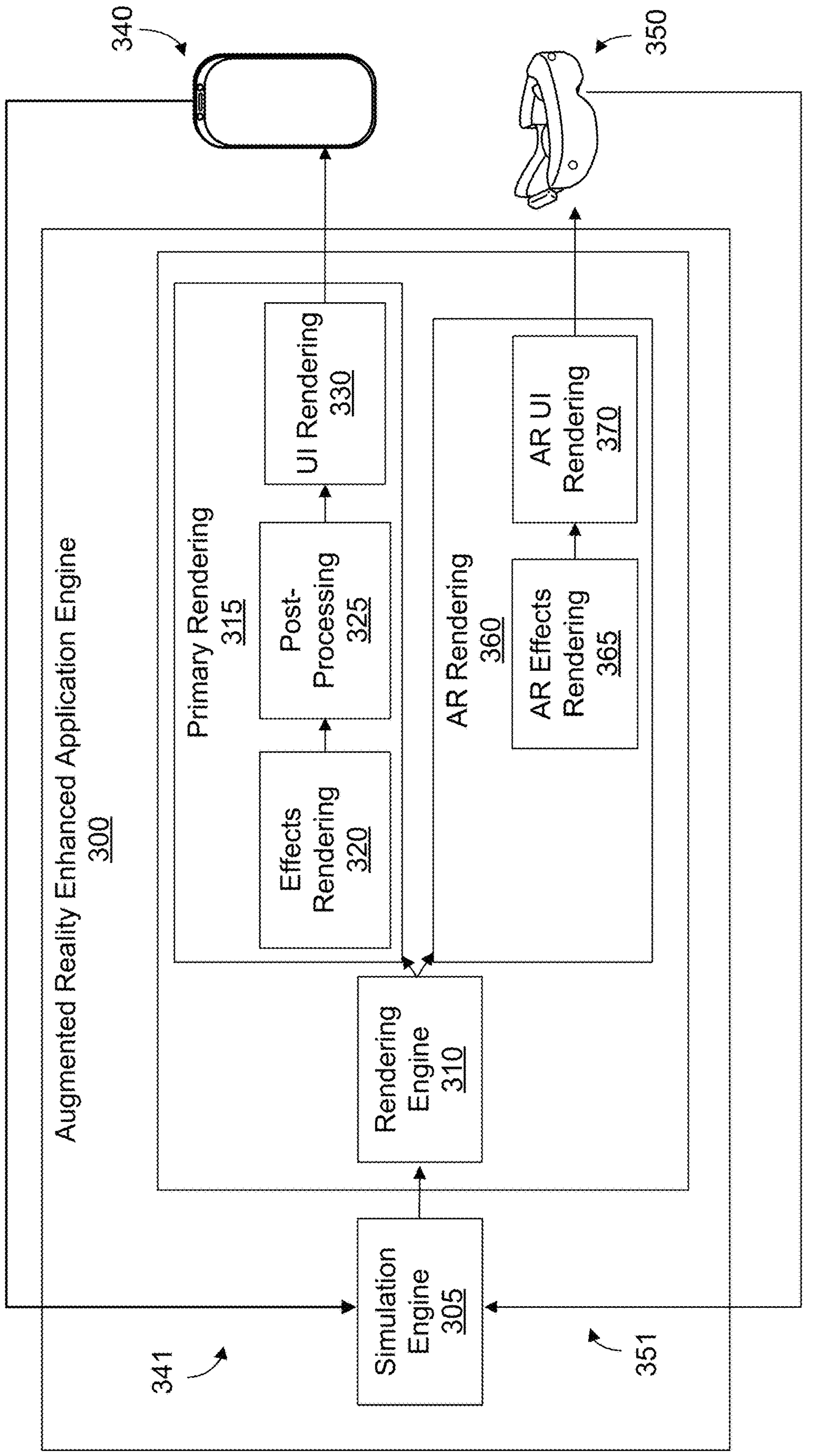
FIG. 3A illustrates an example of an augmented reality enhanced application engine, in accordance with aspects of the present disclosure.

FIG. 3A illustrates an example of an augmented reality enhanced application engine 300, in accordance with aspects of the present disclosure. In some cases, the augmented reality enhanced application engine 300 may be implemented as a part of the XR engine 220 of FIG. 2. In the illustrative example, the augmented reality enhanced application engine 300 includes a simulation engine 305, a rendering engine 310, a primary rendering module 315, and AR rendering module 360. As illustrated, the primary rendering module 315 can include an effects rendering engine 320, a post-processing engine 325, and a user interface (UI) rendering engine 330. The AR rendering module 360 can include an AR effects rendering engine 365 and an AR UI rendering engine 370. It should be noted that the components 305-370 shown in FIG. 3A are non-limiting examples provided for illustrative and explanation purposes, and other examples can include more, fewer, or different components than those shown in FIG. 3A.

In some cases, the augmented reality enhanced application engine 300 is included in and/or is in communication with (wired or wirelessly) an electronic device 340. In some examples, the augmented reality enhanced application engine 300 is included in and/or is in communication with (wired or wirelessly) an XR system 350.

In the illustrated example of FIG. 3A, the simulation engine 305 can generate a simulation for the augmented reality enhanced application engine 300. In some cases, the simulation can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrahedrons, other polyhedrons, rounded polyhedrons with one or more rounded edges and/or corners, portions thereof, or combinations thereof), textures for shapes, bump-mapping for shapes, lighting effects, or combinations thereof. In some examples, the simulation can include at least a portion of an environment. The environment may be a real-world environment, a virtual environment, and/or a mixed environment that includes real-world environment elements and virtual environment elements.

In some cases, the simulation generated by the simulation engine 305 can be dynamic. For example, the simulation engine 305 can update the simulation based on different triggers, including, without limitation, physical contact, sounds, gestures, input signals, passage of time, and/or any combination thereof. As used herein, an application state of the augmented reality enhanced application engine 300 can include any information associated with the simulation engine 305, rendering engine 310, primary rendering module 315, effects rendering engine 320, post-processing engine 325, UI rendering engine 330, AR rendering module 360, AR effects rendering engine 365, AR UI rendering engine 370, inputs to the augmented reality enhanced application engine 300, outputs from the augmented reality enhanced application engine 300, and/or any combination thereof at a particular moment in time.

As illustrated, the simulation engine 305 can obtain mobile device input 341 from the mobile device 340. In some cases, the simulation engine 305 can obtain XR system input 351 from the XR system 350. The mobile device input 341 and/or XR system input 351 can include, for example, user input through a user interface of the application displayed on the display of the mobile device 340, user inputs from an input device (e.g., input device 208 of FIG. 2), one or more sensors (e.g., image sensor 202, accelerometer 204, gyroscope 206 of FIG. 2). In some cases, simulation engine 305 can update the application state for the augmented reality enhanced application engine 300 based on the mobile device input 341, XR system input 351, and/or any combination thereof.

In the illustrative example of FIG. 3A, the rendering engine 310 can obtain application state information from the simulation engine 305. In some cases, the rendering engine 310 can determine portions of the application state information to be rendered by the displays available to the augmented reality enhanced application engine 300. For example, the rendering engine rendering engine 310 can determine whether a connection (wired or wireless) has been established between the XR system 350 and the mobile device 340. In some cases, the rendering engine 310 can determine the application state information to be rendered by the primary rendering module 315 and the AR rendering module 360. In some cases, the rendering engine 310 can determine that the XR system 350 is not connected (wired or wirelessly) to the mobile device 340. In some cases, the rendering engine 310 can determine the application state information for the primary rendering module 315 and forego determining application state information to be rendered by the AR rendering module 360 that will not be displayed. Accordingly, the rendering engine 310 can facilitate an adaptive rendering configuration for the augmented reality enhanced application engine 300 based on the availability and/or types of available displays. In some implementations, a separate rendering engine 310 as shown in FIG. 3A may be excluded. In one illustrative example, the primary rendering module 315 and/or AR rendering module 360 can include at least a portion of the functionality of the rendering engine 310 described above.

The primary rendering module 315 can include an effects rendering engine 320, post-processing engine 325, and UI rendering engine 330. In some cases, the primary rendering module 315 can render image frames configured for display on a display of the mobile device 340. As illustrated, the primary rendering module 315 can output the generated image frames (e.g., media content) to be displayed on a display of the mobile device 340. In some cases, effects rendering information can be used to render application state information generated by the simulation engine 305. For example, the effects rendering engine can generate a 2D projection of a portion of a 3D environment included in the application state information. For example, the effects rendering engine 320 may generate a perspective projection of the 3D environment by a virtual camera. In some cases, the application state information can include a pose of the virtual camera within the environment. In some cases, the effects rendering engine 320 can generate additional visual effects that are not included within the 3D environment. For example, the effects rendering engine 320 can apply texture maps to enhance the visual appearance of the effects generated by the effects rendering engine 320. In some cases, the effects rendering engine 320 can exclude portions of the application state information designated for the AR rendering module 360 by the rendering engine 310. For example, the primary rendering module 315 may exclude effects present in the environment of the simulation.

In some cases, post-processing engine 325 can provide additional processing to the rendered effects generated by the effects rendering engine 320. For example, the post-processing engine 325 can perform scaling, image smoothing, z-buffering, contrast enhancement, gamma, color mapping, any other image processing, and/or any combination thereof.

In some implementations, UI rendering engine 330 can render a UI. In some cases, the user interface can provide application state information in addition to the effects rendered based on the application environment (e.g., a 3D environment). In some cases, the UI can be generated as an overlay over a portion of the image frame output by the post-processing engine 325.

The AR rendering module 360 can include an AR effects rendering engine 365, an AR UI rendering engine 370. In some cases, the AR effects rendering engine 365 can render application state information generated by the simulation engine 305. For example, the AR effects rendering engine 365 can generate a 2D projection of a 3D environment included in the application state information. In some cases, the AR effects rendering engine 365 can generate effects that appear to protrude out from the display surface of the display of the mobile device 340.

In some cases, the display of the XR system 350 can have different display parameters (e.g., a different resolution, frame rate, aspect ratio, and/or any other display parameters) than the display of the mobile device 340. In some cases, the display parameters can also vary between different types of output devices (e.g., different HMD models, other XR systems, or the like). As a result, rendering display data for the 350 with the AR rendering module 360 can affect performance of the primary rendering module 315 (e.g., by consuming computational resources of a GPU, CPU, memory, or the like). In some cases, inclusion of the AR rendering module 360 within the augmented reality enhanced application engine 300 can require periodic updates to provide compatibility with different devices.

As indicated above, in some cases, an XR system may track physical objects, such as parts of the user, to allow the user to interact with virtual content, such as virtual objects. As an example, the XR system may use one or more cameras (e.g., image sensor 130 of FIG. 1, image sensor 202 of FIG. 2, and the like) to track a hand of the user via one or more keypoints of the hands (e.g., physical object).

Figure 3B:
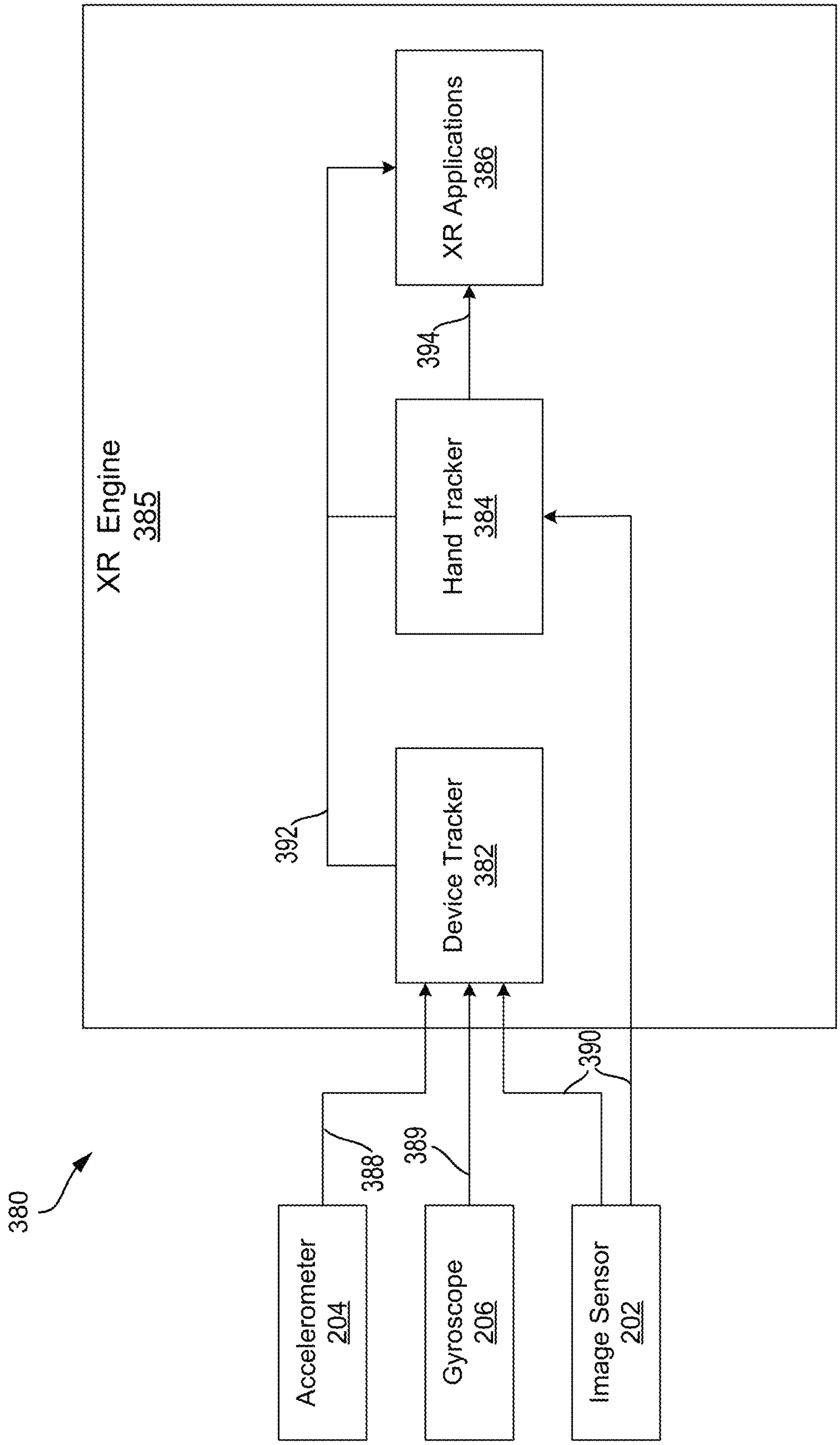
FIG. 3B is a block diagram illustrating an example system for hand tracking, in accordance with aspects of the present disclosure.

FIG. 3B is a block diagram illustrating an example system for hand tracking 380, in accordance with aspects of the present disclosure. In FIG. 3B, a device tracker 382 can receive measurements 388 from an accelerometer 204, measurements 389 from a gyroscope 206, and image data 390 from image sensor 202 (e.g., image sensor 202 of FIG. 2). In some examples, the measurements 388 may include motion measurements from the accelerometer 204 (e.g., accelerometer 204 of FIG. 2) and the measurements 389 may include orientation measurements from the gyroscope 206 (e.g., gyroscope 206 of FIG. 2). For example, the measurements 388 can include one or more translational vectors (e.g., up/down, left/right, forward/back) from the accelerometer 204 and the measurements 388 can include one or more rotational vectors (e.g., pitch, yaw, roll) from the gyroscope 206. Moreover, the image data 390 can include one or more images or frames captured by the image sensor 202 (e.g., image sensor 202 of FIG. 2). The one or more images or frames can capture a scene associated with the XR system and/or one or more portions of the scene (e.g., one or more regions, objects, humans, etc.).

In some examples, the device tracker 382 may be implemented as a part of an XR engine 385 (e.g., XR engine 220 of FIG. 2) of an extended reality system. In other cases, the device tracker 382 can be separate from the XR engine 385 and implemented by one or more of the compute components on the XR system.

The device tracker 382 may use the measurements 388, 389 and image data 390 to track a pose (e.g., a 6DOF pose) of the extended reality system. For example, the device tracker 382 may fuse visual data from the image data 390 with inertial data (e.g., motion data, orientation data, etc.) from the measurements 388, 389 to determine a position and motion of the extended reality system relative to the physical world (e.g., the scene) and a map of the physical world. In some examples, when tracking the pose of the extended reality system, the device tracker 382 can generate a three-dimensional (3D) map of the scene (e.g., the real world) and/or generate updates for a 3D map of the scene. The 3D map updates can include, for example and without limitation, new or updated features and/or keypoints associated with the scene and/or the 3D map of the scene, localization updates identifying or updating a position of the extended reality system within the scene and the 3D map of the scene, etc. The 3D map can provide a digital representation of a scene in the real/physical world. In some examples, the 3D map can anchor location-based objects and/or content to real-world coordinates and/or objects. The extended reality system can use a mapped scene (e.g., a scene in the physical world represented by, and/or associated with, a 3D map) to merge the physical and virtual worlds and/or merge virtual content or objects with the physical environment.

The device tracker 382 may provide tracking data 392 generated from the measurements 388 and the image data 390 to a hand tracker 384, and a set of XR applications 386. The tracking data 392 may include the pose of the XR system and map data calculated by the device tracker 382. The map data can include a 3D map of the scene and/or map updates for a 3D map of the scene, as previously described.

In some cases, the hand tracker 384 may be included as a component of the XR engine 385. In some cases, the hand tracker 384 may be implemented by an XR system to track a hand (e.g., hand 426 of FIG. 4) of the user associated with the XR system and/or fingertips in the hand of the user, as previously explained. For simplicity and explanation purposes, the hand tracker 384 will be described herein as a component for tracking hands. However, it should be noted that, in other examples, the hand tracker 384 may track other objects and/or body parts. For example, as previously noted, the hand tracker 384 may track fingers or fingertips on a hand either in addition to, or instead of, tracking the hand itself.

In some examples, the hand tracker 384 can be part of, or implemented by, the XR engine 385 on the XR system. In other examples, the device tracker 384 may be separate from the XR engine 385 and implemented by one or more of the compute components on the XR system.

The hand tracker 384 may also receive the image data 390 from the image sensor 202. The hand tracker 384 may use the image data 390 and the tracking data 392 to track a hand pose 394 (e.g., a pose of the hand and/or fingers/fingertips of the hand). In some examples, the hand tracker 384 can determine the hand pose 394 based on keypoints of the hand. The hand tracker 384 can then provide the hand pose 394 to one or more XR application 386. In some examples, the XR applications 386 can be an application on the XR system designed and/or configured to provide a particular XR experience. In some cases, an AR engine, such as the augmented reality enhanced application engine 300, may be an XR application 386. The XR applications 386 may also include higher level applications, such, for example, an AR gaming experience, an AR classroom experience, and/or any other XR experiences. The XR applications 386 may be a part of, or implemented by, the XR engine 385 or can be separate from the XR engine 385.

Figure 4:
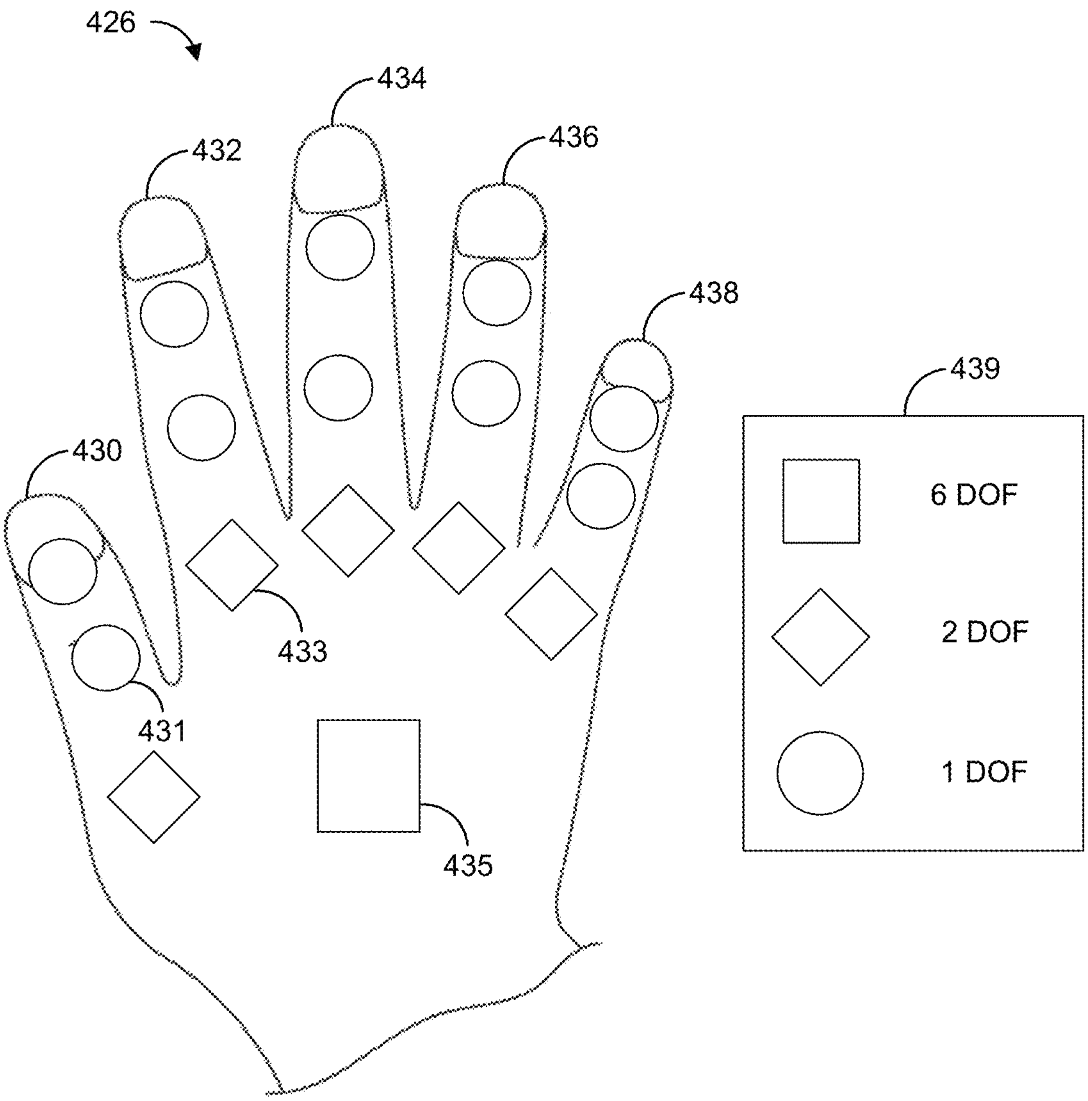
FIG. 4 is a diagram illustrating an example of keypoints of a hand, in accordance with aspects of the present disclosure.

FIG. 4 is a diagram illustrating an example of keypoints of a hand 426, in accordance with aspects of the present disclosure. The keypoints shown in FIG. 4 correspond to different parts of the hand 426, including a keypoint 435 on the palm of the hand, three keypoints on the thumb 430 of the hand 426, three keypoints on the index finger 432 of the hand 426, three keypoints on the middle finger 434 of the hand 426, three keypoints on the ring finger 436 of the hand 426, and three keypoints on the pinky 438 of the hand 426. The palm of the hand 426 can move in three translational directions (e.g., measured in X, Y, and Z directions relative to a plane, such as an image plane) and in three rotational directions (e.g., measured in yaw, pitch, and roll relative to the plane), and thus provides six degrees of freedom (6DOF) that can be used for registration and/or tracking. The 6DOF movement of the palm is illustrated as a square in FIG. 4, as indicated in the legend 439.

The different joints of the fingers of the hand 426 allow for different degrees of movement, as illustrated in the legend 439. As illustrated by the diamond shapes (e.g., diamond 433) in FIG. 4, the base of each finger (corresponding to the metacarpophalangeal joint (MCP) between the proximal phalanx and the metacarpal) has two degrees of freedom (2DOF) corresponding to flexion and extension as well as abduction and adduction. As illustrated by the circle shapes (e.g., circle 431) in FIG. 4, each of the upper joints of each finger (corresponding to the interphalangeal joints between the distal, middle, and proximal phalanges) has one degree of freedom (1DOF) corresponding to flexion and extension.

In some cases, the XR system may use one or more of the keypoints on the hand 426 to track the hand 426 (e.g., track a pose and/or movement of the hand 426) and track interactions with a virtual interface rendered by the XR system. As noted above, as a result of the detection of the one or more keypoints on the hand 426, the pose of the keypoints (and thus the hand and fingers) in relative physical position with respect to the XR system can be established. For example, the keypoints on the palms of the hand 426 (e.g., the keypoint 435) can be detected in an image, and the locations of the keypoints can be determined with respect to an image sensor of the XR system. A point of a virtual interface (e.g., a center point, such as a center of mass or other center point) rendered by the XR system and/or an interface element on the virtual interface selected by the hand 426, or with which the hand 426 has interacted, can be translated to a position on a display (or a rendering on the display) of the XR system relative to the locations determined for the keypoints on the palms of the hand 426. In some examples, a point of a portion of the virtual interface with which the hand 426 has interacted with can be registered relative to locations of one or more keypoints on the hand 426.

In some examples, the XR system can also register the virtual interface and/or the hand 426 to points in the real world (as detected in one or more images) and/or to other parts of the user. For instance, in some implementations, in addition to determining a physical pose of the hand 426 with respect to the XR system and/or a virtual interface, the XR system can determine the location of other keypoints, such as distinctive points (referred to as keypoints) on walls, one or more corners of objects, features on a floor, points on a human face, points on nearby devices, among others. In some cases, the XR system can place the virtual interface within a certain position with respect to keypoints detected in the environment, which can correspond to, for example, detected objects and/or humans in the environment.

As previously mentioned, devices (e.g., mobile devices, such as XR devices) and systems have been increasingly leveraging hand tracking systems that utilize images for tracking hand gestures. Pose classification is an important algorithms in a hand tracking system (e.g., because pose classification can be used to understand what a user is doing to be able to create some interactions with a virtual environment). Pose classification can be used in runtime to classify a pose of a hand (e.g., a hand gesture). In the modern state-of-the-art systems, heuristics or machine learning models (e.g., along with manually annotated classes) are often employed to classify traditional hand gestures (e.g., pinch, grab, and open hand gestures).

Due to the limitations of the current state-of-the-art methods, effective classification of inter-gestures (e.g., hand gestures that are other than traditional hand gestures and/or are in between traditional hand gestures) may be challenging. Consequently, creating flexible gestures and dynamic motion gestures (e.g., smoothly transitioning from an inter-gesture to a traditional hand gesture) is not possible with these methods. Moreover, this limitation of not being able to create flexible gestures or dynamic motion gestures may restrict the ability to effectively meet new user experience (UX) requirements and demands. A potential ambiguity issue may also exist between two hand gestures (e.g., a pinch gesture and a pincer gesture), which can be often indistinguishable from each other by most current methods. Therefore, improved systems and techniques that provide an effective classification of hand gestures, including both traditional hand gestures and inter-gestures, may be useful.

In one or more aspects, the systems and techniques provide a hand pose classification model based on fingers encoding. In one or more examples, the systems and techniques utilize an encoding mechanism that captures the iterative transition dynamics between different finger states (e.g., open and closed finger states), with the option to choose the number of iterations (e.g., number of different finger positions). The model uses 3D keypoints of the hand (e.g., determined from an image of the hand) as input and predicts for each finger the value of the transition. The creation of traditional hand gestures and inter-gestures may be simplified by utilizing this encoding model. The creation of flexible hand gestures can also be possible and simple when using this model with regular expressions. Transitioning from an inter-gesture to another hand gesture can be a consistent way to detect dynamic hand gesture motions. The disclosed model is able to meet UX requirements and demands for any needed new hand gesture. The model may also be applied for classifying datasets. For example, for quality assurance (QA) datasets, the model may be used to analyze test results effectively. For training datasets, the model may be employed to achieve proper balancing and enhancement.

In one or more aspects, the systems and techniques provide a hand pose classification model based on finger encoding that utilizes an encoding mechanism that captures iterative transition dynamics between different finger states (e.g., open and closed finger states or positions) with a number of iterations (e.g., a number of different finger states or positions). For example, for FIG. 5, an example fixed setting of three (3) iterations (e.g., finger positions) is shown. The model can predict for each finger a value (e.g., a number) of the transition (e.g., corresponding to a position of the finger).

Figure 5:
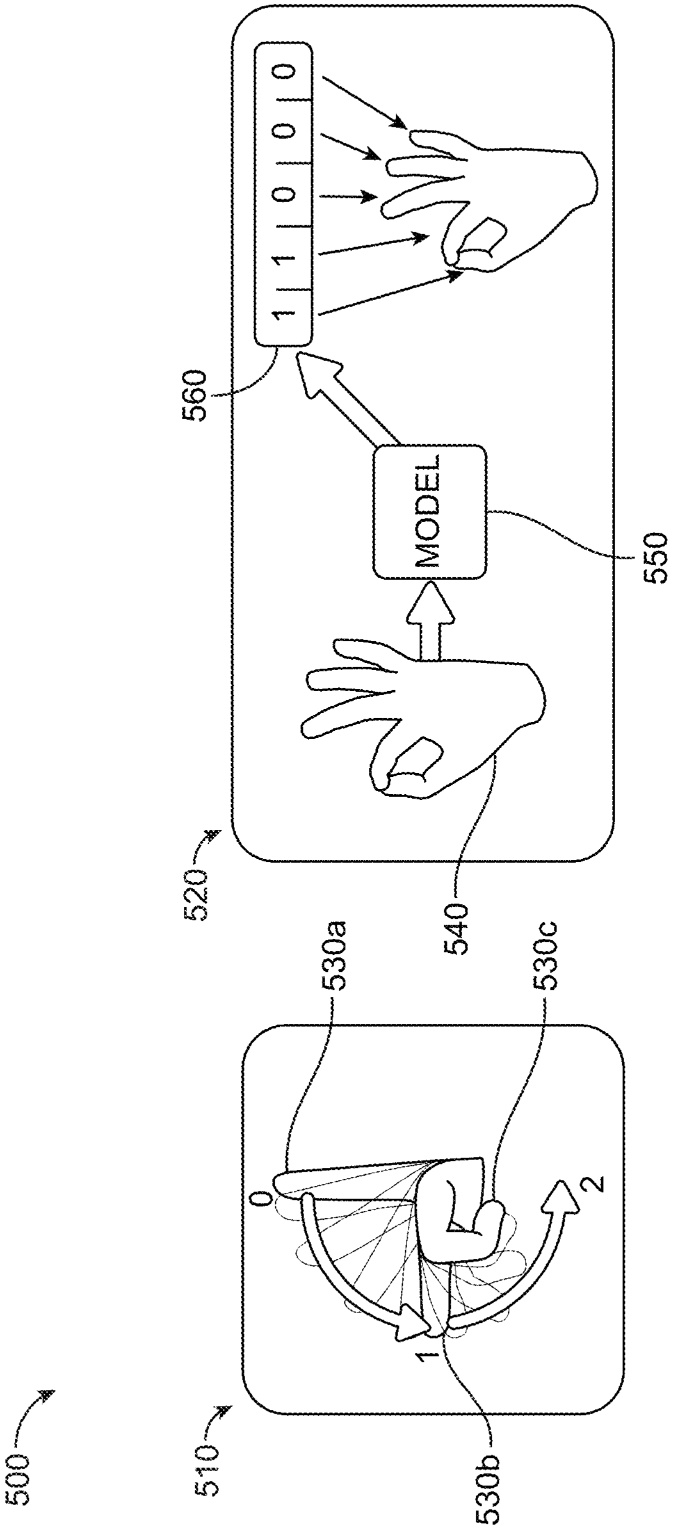
FIG. 5 is a diagram illustrating an example of encoding fingers of a hand making a hand gesture, in accordance with aspects of the present disclosure.

FIG. 5 shows an example of the disclosed hand pose classification model. In particular, FIG. 5 is a diagram illustrating an example 500 of encoding fingers of a hand making a hand gesture (e.g., hand gesture 540).

In FIG. 5, an example 510 showing encodings for different finger positions is shown. In particular, the example 510 shows numbers (e.g., 0, 1, and 2) that can be used to encode three different finger positions (e.g., an open finger position 530*a*, an intermediate finger position 530*b*, and a closed finger position 530*c*) for a finger of a hand making a hand gesture. For example, a finger with an open finger position 530*a* can be encoded with a number zero (0), a finger with an intermediate finger position 530*b* can be encoded with a number one (1), and a finger with a closed finger position 530*c* can be encoded with a number two (2). In one or more examples, the intermediate finger position 530*b* can be a finger position that is between the open finger position 530*a* and the closed finger position 530*c*. In one or more examples, more or less number of finger positions (e.g., four different finger positions) can be encoded by more or less numbers (e.g., 0, 1, 2, and 3) than as shown in FIG. 5.

In FIG. 5, an example of a process 520 for classifying a hand gesture 540 is shown. In one or more examples, during operation of the process 520 for classifying a hand gesture 540, one or more processors (e.g., of a device, such as a mobile device, for example an XR device) can receive an image of a hand with a hand gesture 540. The one or more processors, based on the image of the hand and 3D keypoints of the hand (e.g., 3D keypoints detected in the image of the hand) with the hand gesture 540, can encode one or more fingers (e.g., only two of the fingers or all five fingers) of the five fingers of a hand with a code 560. In one or more examples, the one or more processors can utilize a model 550 (e.g., a machine learning model) to encode the one or more fingers of the five fingers of a hand with the code 560. The model 550 can receive the 3D keypoints of the hand as input. Based on the 3D keypoints, the model 550 can encode the fingers of the hand with the code 560. The code 560 can correspond to a position (or state) associated with the one or more fingers making the hand gesture 540.

The code 560 can include a number for each of the one or more fingers of the hand. For example, as shown in FIG. 5, for the hand gesture 540, the first finger (e.g., thumb) can be encoded with a number 1 (e.g., for being in an intermediate position), the second finger (e.g., pointer finger) can be encoded with a number 1 (e.g., for being in an intermediate position), the third finger (e.g., middle finger) can be encoded with a number 0 (e.g., for being in an open position), the fourth finger (e.g., ring finger) can be encoded with a number 0 (e.g., for being in an open position), and the fifth finger (e.g., pinky finger) can be encoded with a number 0 (e.g., for being in an open position). As such, the code 560 may have the numbers 1, 1, 0, 0, 0 for the hand gesture 540.

The one or more processors can determine a classification for the hand gesture 540. In some examples, the classification can include the code 560 (e.g., 1, 1, 0, 0, 0) associated with the one or more fingers of the hand. In one or more examples, the one or more processors can determine the classification for the hand gesture 540 based on the model 550 (e.g., a machine learning model). In some examples, the model 550 can be trained based on a plurality of different hand models with keypoints (e.g., hand 1310 with associated keypoints of FIG. 13), angles (e.g., hand 1320 with associated angles of FIG. 13), and/or unit vectors (e.g., hand 1330 with associated unit vectors of FIG. 13) associated with the classification for the hand gesture 540. In one or more examples, the model 550 can be a self-supervised machine learning model. In some examples, the one or more processors can then perform a function (e.g., an XR function) based on the classification of the hand gesture 540.

In one or more aspects, the disclosed encoding model can simply and flexibly create many different and new hand gestures. In one or more examples, a new hand gesture (e.g., which may be referred to as an inter-gesture) can be created by using this encoding method. For example, the creation of an inter-gesture by using this encoding method is shown in FIG. 6.

Figure 6:
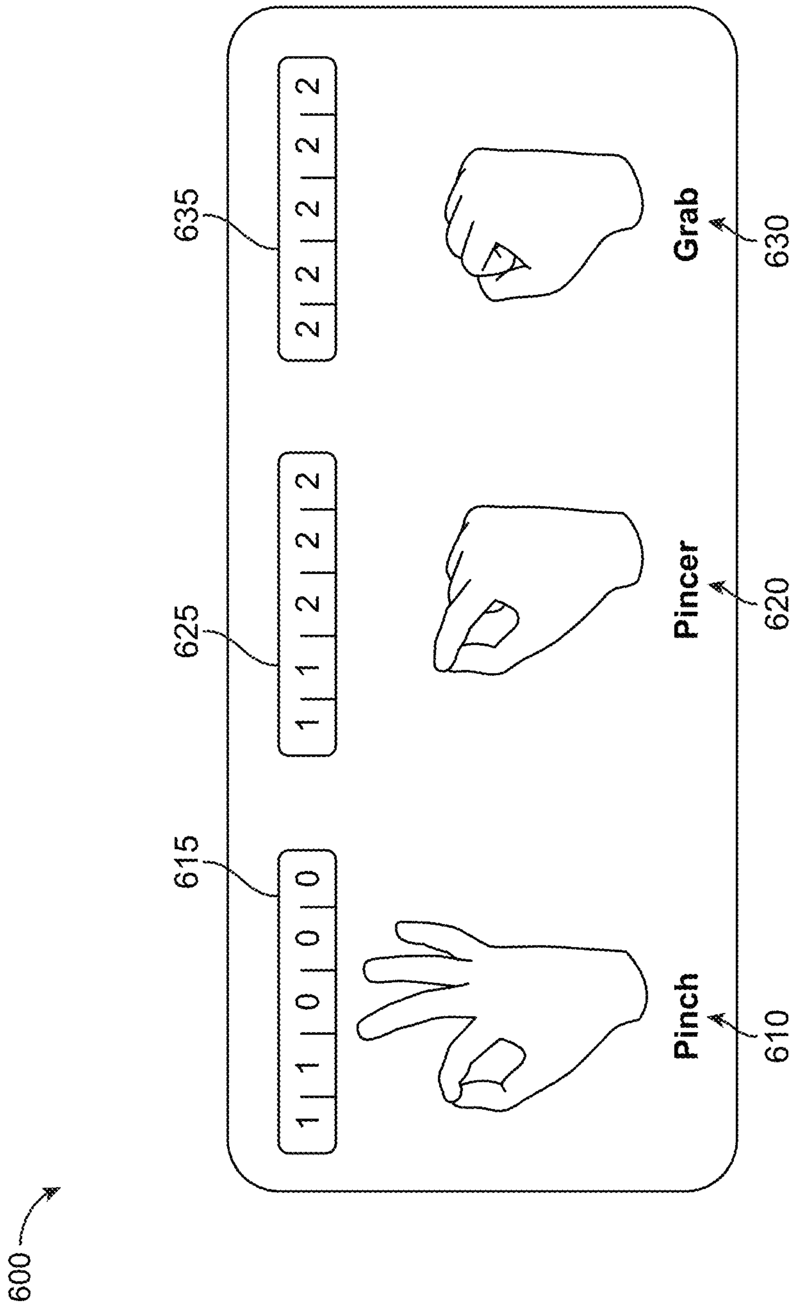
FIG. 6 is a diagram illustrating examples of encoding traditional hand gestures and an inter-gesture, in accordance with aspects of the present disclosure.

FIG. 6 is a diagram illustrating examples 600 of encoding traditional hand gestures and an inter-gesture. In particular, in FIG. 6, two traditional hand gestures (e.g., a pinch hand gesture 610 and a grab hand gesture 630) are shown. FIG. 6 also shows an inter-gesture (e.g., a pincer gesture 620). Also shown in FIG. 6 are example corresponding codes 615, 625, 635 for the traditional hand gestures and the inter-gesture. For example, the pinch gesture 610 may be encoded with the code 615 (e.g., 1, 1, 0, 0, 0), the pincer gesture 620 may be encoded with the code 625 (e.g., 1, 1, 2, 2, 2), and the grab gesture 630 may be encoded with the code 635 (e.g., 2, 2, 2, 2, 2).

As previously mentioned, with current state-of-the-art systems, a potential ambiguity issue can exist between the pinch gesture 610 and the pincer gesture 620, which are often indistinguishable from each other by most current methods. Conversely, the disclosed encoding model, by encoding all five fingers of the hand with a code (e.g., code 615, 625), is able to distinguish between the pinch gesture 610 and the pincer gesture 620.

In one or more aspects, the creation of flexible gestures can be possible and simple with the utilization of the disclosed model with regular expressions. For example, the creation of a flexible gesture is shown in FIG. 7.

Figure 7:
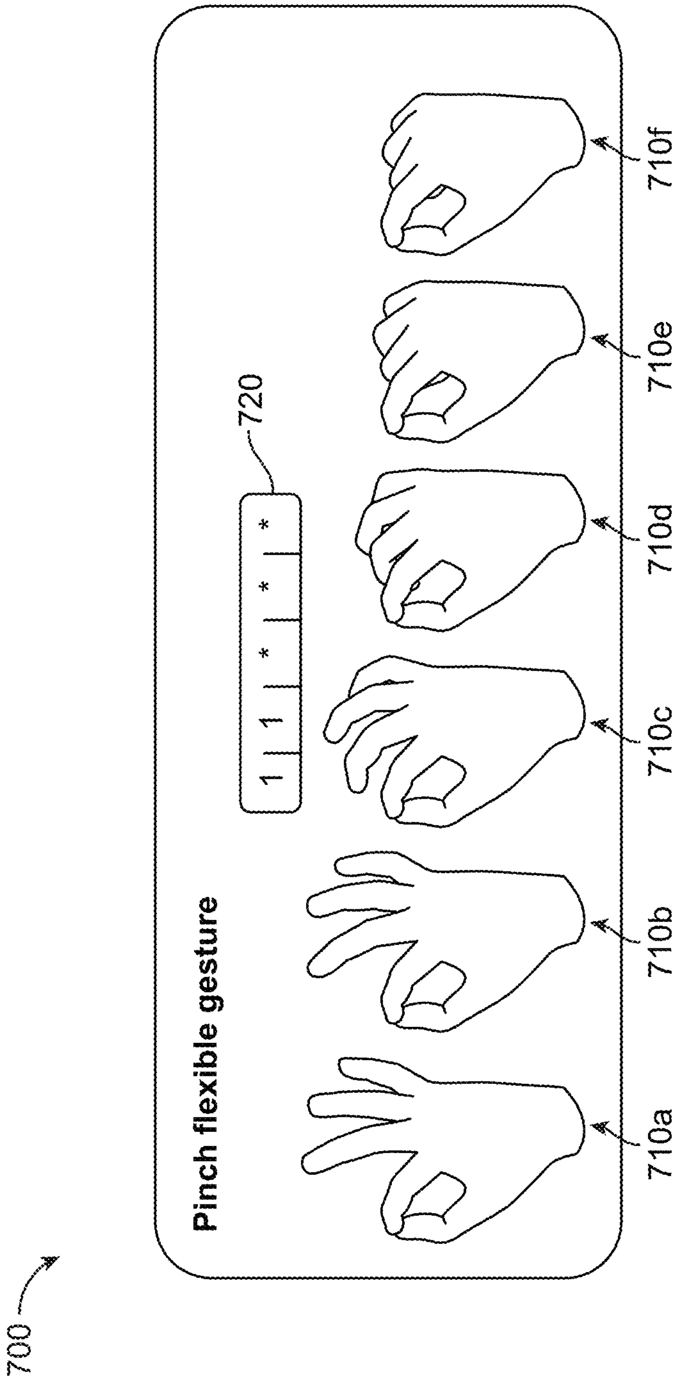
FIG. 7 is a diagram illustrating an example of encoding a flexible gesture, in accordance with aspects of the present disclosure.

In particular, FIG. 7 is a diagram illustrating an example 700 of encoding a flexible gesture. In FIG. 7, the creation of a flexible pinch gesture is shown. The flexible pinch gesture can include a plurality of different hand gestures, including the pinch gesture 710*a* and the pincer gesture 710*f*. In FIG. 7, an example of a corresponding code 720 for the flexible pinch gesture is shown. For example, the pinch gesture 710*a*, the pincer gesture 710*f*, and the hand gestures 710*b*, 710*c*, 710*d*, 710*e* (e.g., between a transition from the pinch gesture 710*a* to the pincer gesture 710*f*) can each be encoded with the code 720 (e.g., 1, 1, *, *, *), where the * symbol can represent a number 0, 1, or 2. As such, the code 720 (e.g., 1, 1, *, *, *) can be used to classify the flexible pinch gesture, which can include all possible transitional hand gestures from a pinch gesture 710*a* to a pincer gesture 710*f*.

In one or more aspects, transitioning from an inter-gesture to another hand gesture can be a consistent way to detect dynamic hand gesture motions. In one or more examples, the transition from an inter-gesture to another hand gesture can be captured by the disclosed method. In some examples, an inter-gesture (e.g., inter-gesture 820 of FIG. 8) can occur in between a first hand gesture (e.g., classic gesture 810 of FIG. 8) and a second hand gesture (e.g., classic gesture 830 of FIG. 8) based on the hand transitioning in motion from the first hand gesture to the second hand gesture. The systems and techniques can use a temporal state change to represent a hand gesture (e.g., a pinch gesture can be defined by a sequence of codes occurring in a certain specific order). For example, the creation of a dynamic hand gesture is shown in FIG. 8.

Figure 8:
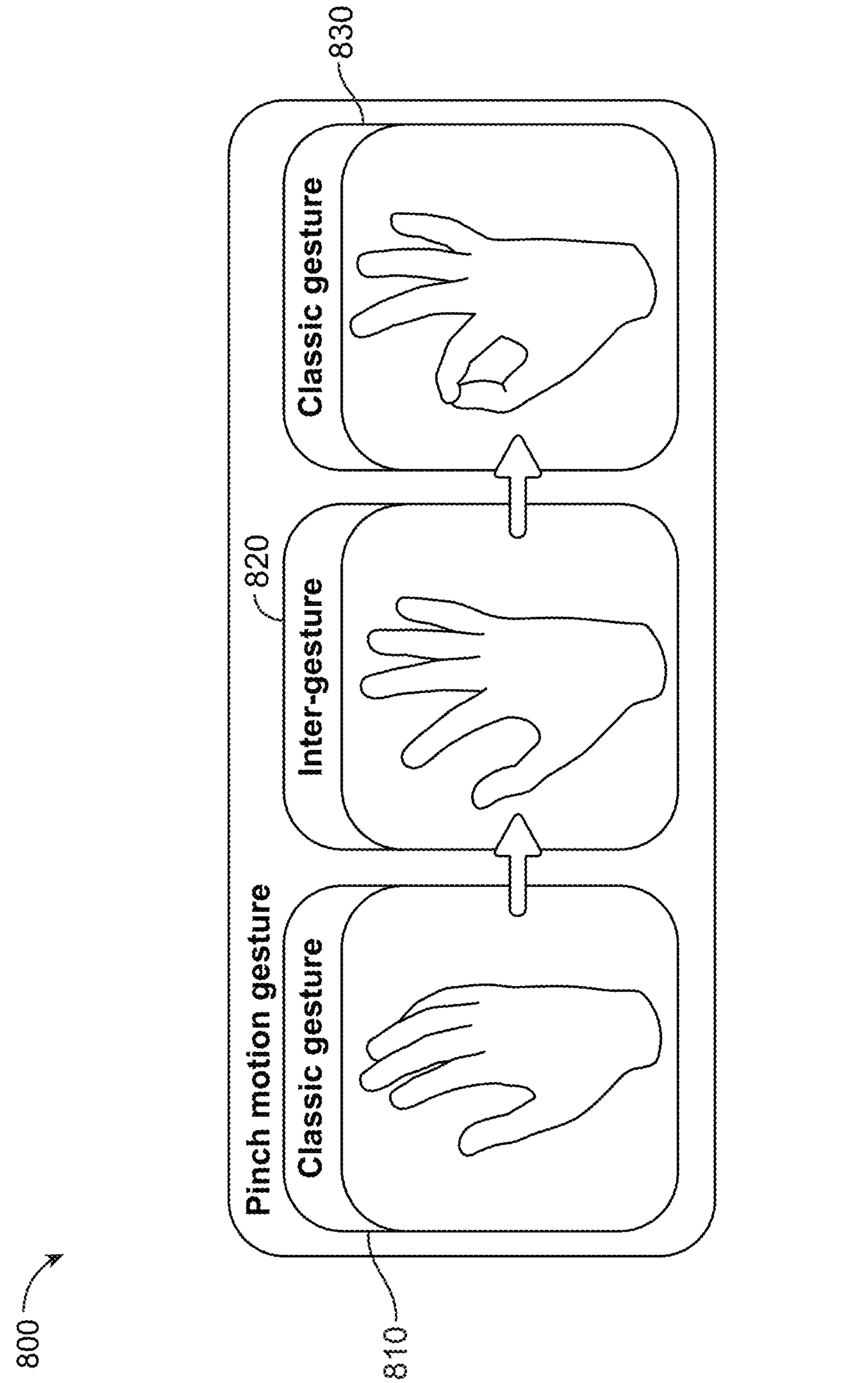
FIG. 8 is a diagram illustrating an example of encoding a dynamic hand gesture, in accordance with aspects of the present disclosure.

FIG. 8 is a diagram illustrating an example of encoding a dynamic hand gesture. In particular, an example of encoding a pinch motion gesture is shown. As shown in FIG. 8, the pinch motion gesture may include the transition from a classic gesture 810 (e.g., an open hand gesture) to an inter-gesture 820 to a classic gesture 830 (e.g., a pinch gesture). In one or more examples, the classic gesture 810 may be encoded with a code (0, 0, 0, 0, 0), the inter-gesture 820 may be encoded with the code (0, 1, 0, 0, 0), and the classic gesture 830 may be encoded with the code (1, 1, 0, 0, 0).

In one or more examples, one or more processors can determine a dynamic hand gesture (e.g., a pinch motion gesture), based on occurrence of a specific first hand gesture (e.g., classic gesture 810), a specific inter-gesture (e.g., inter-gesture 820), and a specific second hand gesture (e.g., classic gesture 830) occurring in a specific certain order. As such, when the one or more processors determine that a sequence of codes (e.g., corresponding to hand gestures) has occurred within a certain order, the one or more processors can determine that the hand is performing a dynamic hand gesture. For example, when the one or more processors determine that the hand has transitioned from the classic gesture 810 (e.g., encoded with code 0, 0, 0, 0, 0) to the inter-gesture 820 (e.g., encoded with code 0, 1, 0, 0, 0) to the classic gesture 830 (e.g., encoded with code 1, 1, 0, 0, 0), the one or more processors can determine that the hand is performing a pinch motion gesture.

Figure 9:
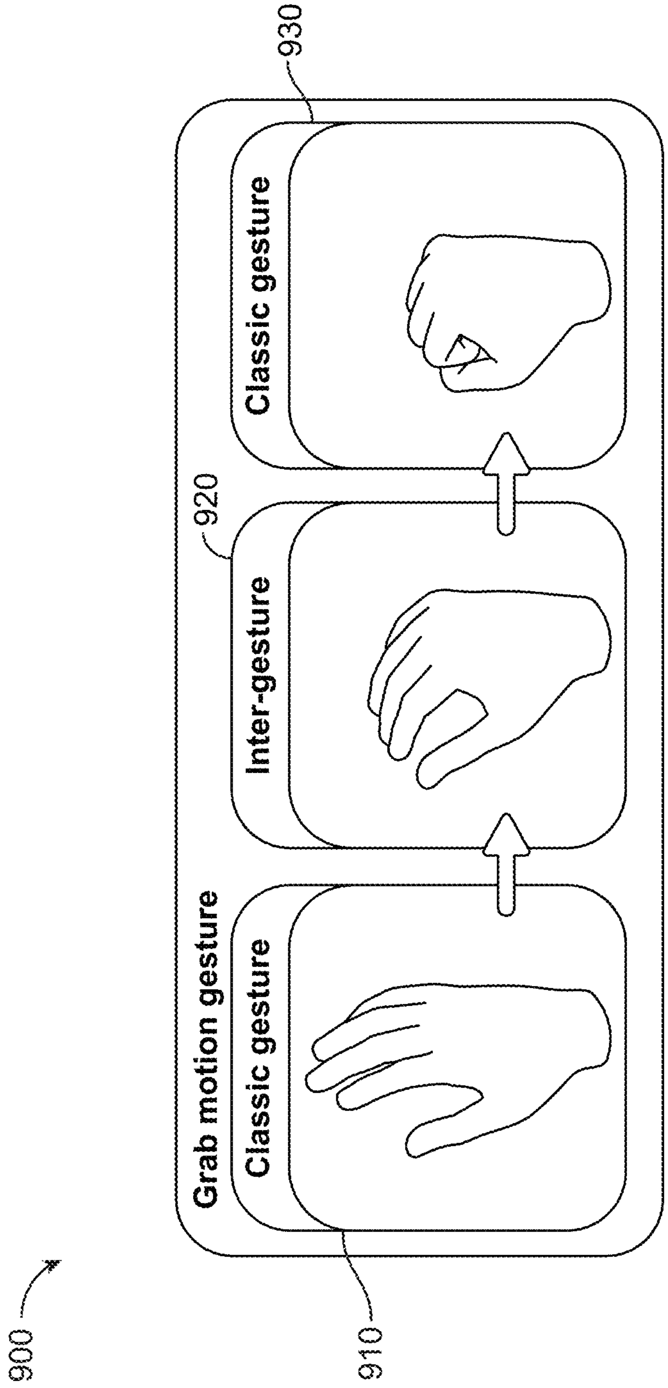
FIG. 9 is a diagram illustrating an example of encoding another dynamic hand gesture, in accordance with aspects of the present disclosure.

FIG. 9 is a diagram illustrating an example of encoding another dynamic hand gesture. As shown in FIG. 9, the grab motion gesture may include the transition from a classic gesture 910 (e.g., an open hand gesture) to an inter-gesture 920 to a classic gesture 930 (e.g., a grab gesture). In one or more examples, the classic gesture 910 may be encoded with a code (0, 0, 0, 0, 0), the inter-gesture 920 may be encoded with the code (0, 1, 1, 1, 1), and the classic gesture 930 may be encoded with the code (2, 2, 2, 2, 2).

In one or more examples, one or more processors can determine a dynamic hand gesture (e.g., a grab motion gesture), based on occurrence of a specific first hand gesture (e.g., classic gesture 910), a specific inter-gesture (e.g., inter-gesture 920), and a specific second hand gesture (e.g., classic gesture 930) occurring in a specific certain order. As such, when the one or more processors determine that a sequence of codes (e.g., corresponding to hand gestures) has occurred within a certain order, the one or more processors can determine that the hand is performing a dynamic hand gesture. For example, when the one or more processors determine that the hand has transitioned from the classic gesture 910 (e.g., encoded with code 0, 0, 0, 0, 0) to the inter-gesture 920 (e.g., encoded with code 0, 1, 1, 1, 1) to the classic gesture 930 (e.g., encoded with code 2, 2, 2, 2, 2), the one or more processors can determine that the hand is performing a grab motion gesture.

As previously mentioned, the creation of traditional hand gestures as well as inter-gestures can be achieved by utilizing the disclosed encoding model. As such, the disclosed model is able to meet UX requirements and demands for any needed new hand gesture.

Figure 10:
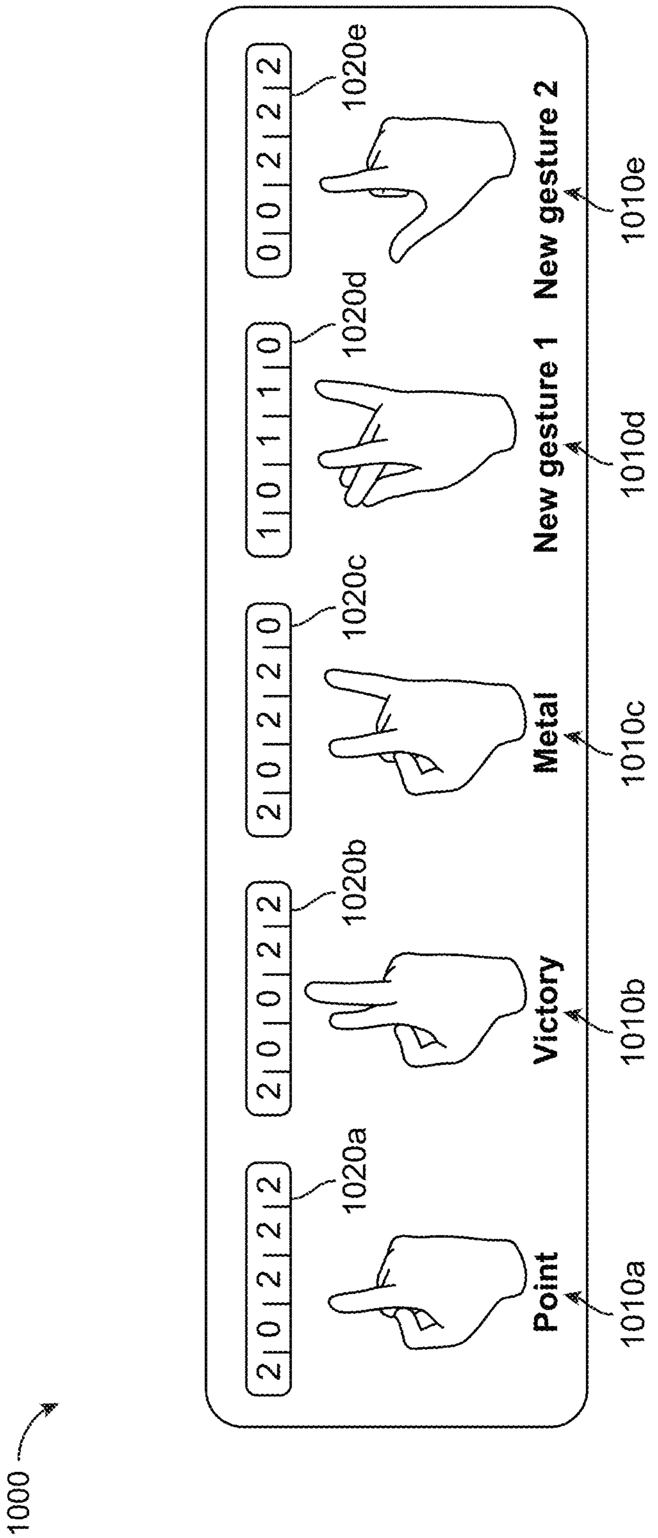
FIG. 10 is a diagram illustrating an example of encoding a plurality of hand gestures, in accordance with aspects of the present disclosure.

FIG. 10 shows examples of new inter-gestures (e.g., new gesture 1 1010*d* and new gesture 2 1010*c*) that may be created by using this encoding model. In particular, FIG. 10 is a diagram illustrating an example of encoding a plurality of hand gestures. In FIG. 10, three traditional gestures (e.g., point gesture 1010*a*, victory gesture 1010*b*, and metal gesture 1010*c*) are shown. Also shown in FIG. 10 are two new inter-gestures (e.g., new gesture 1 1010*d* and new gesture 2 1010*c*). FIG. 10 also shows example corresponding codes 1020*a*, 1020*b*, 1020*c*, 1020*d*, 1020*e* for the traditional hand gestures and the new inter-gestures. For example, the point gesture 1010*a* may be encoded with the code 1020*a* (e.g., 2, 0, 2, 2, 2), the victory gesture 1010*b* may be encoded with the code 1020*b* (e.g., 2, 0, 0, 2, 2), the metal gesture 1010*c* may be encoded with the code 1020*c* (e.g., 2, 0, 2, 2, 0), the new gesture 1 1010*d* may be encoded with the code 1020*d* (e.g., 1, 0, 1, 1, 0), and the new gesture 2 1010*e* may be encoded with the code 1020*c* (e.g., 0, 0, 2, 2, 2).

Figure 11A:
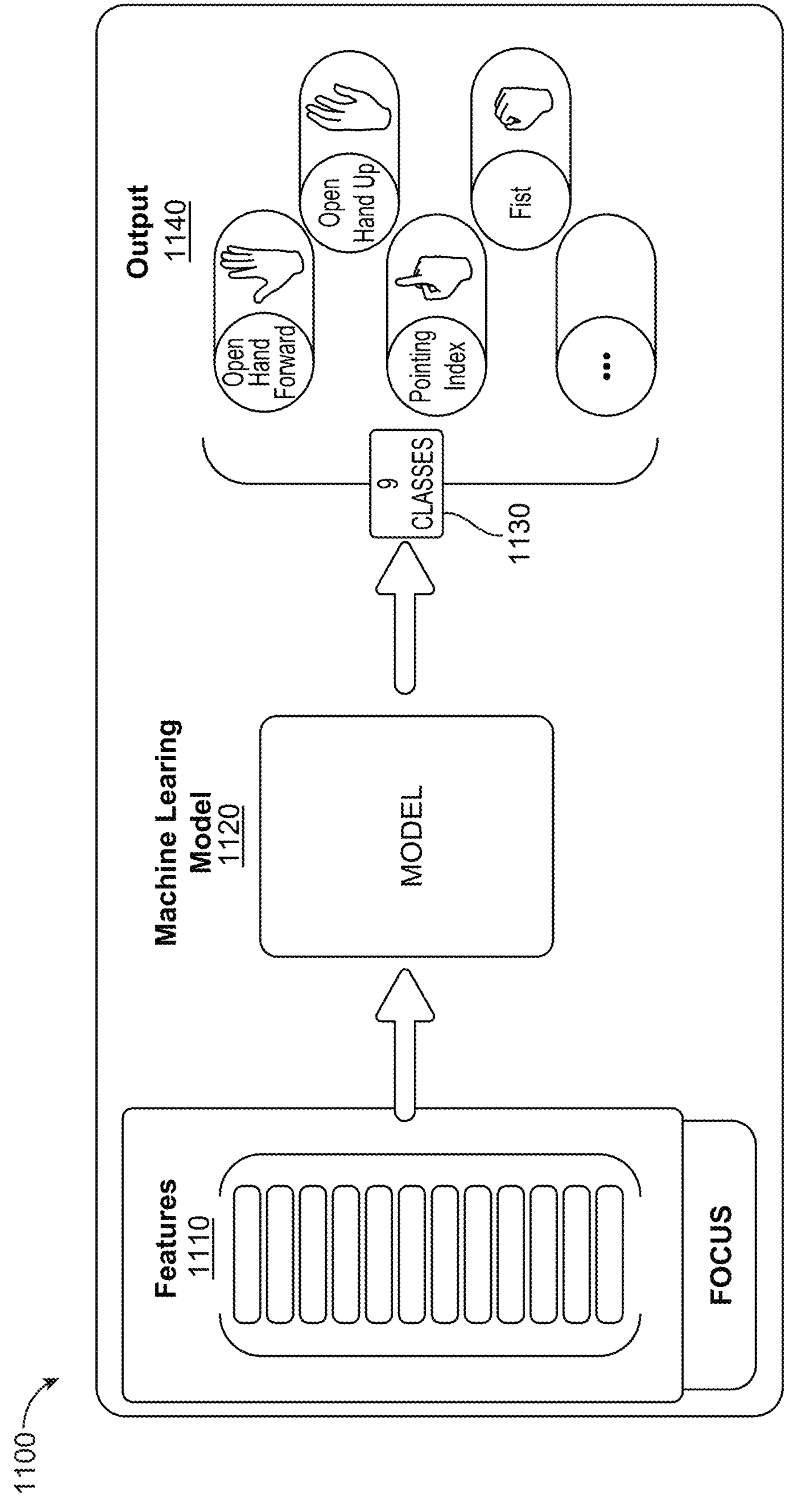
FIG. 11A is a diagram illustrating an example of a model that can classify only traditional hand gestures, in accordance with aspects of the present disclosure.
Figure 11B:
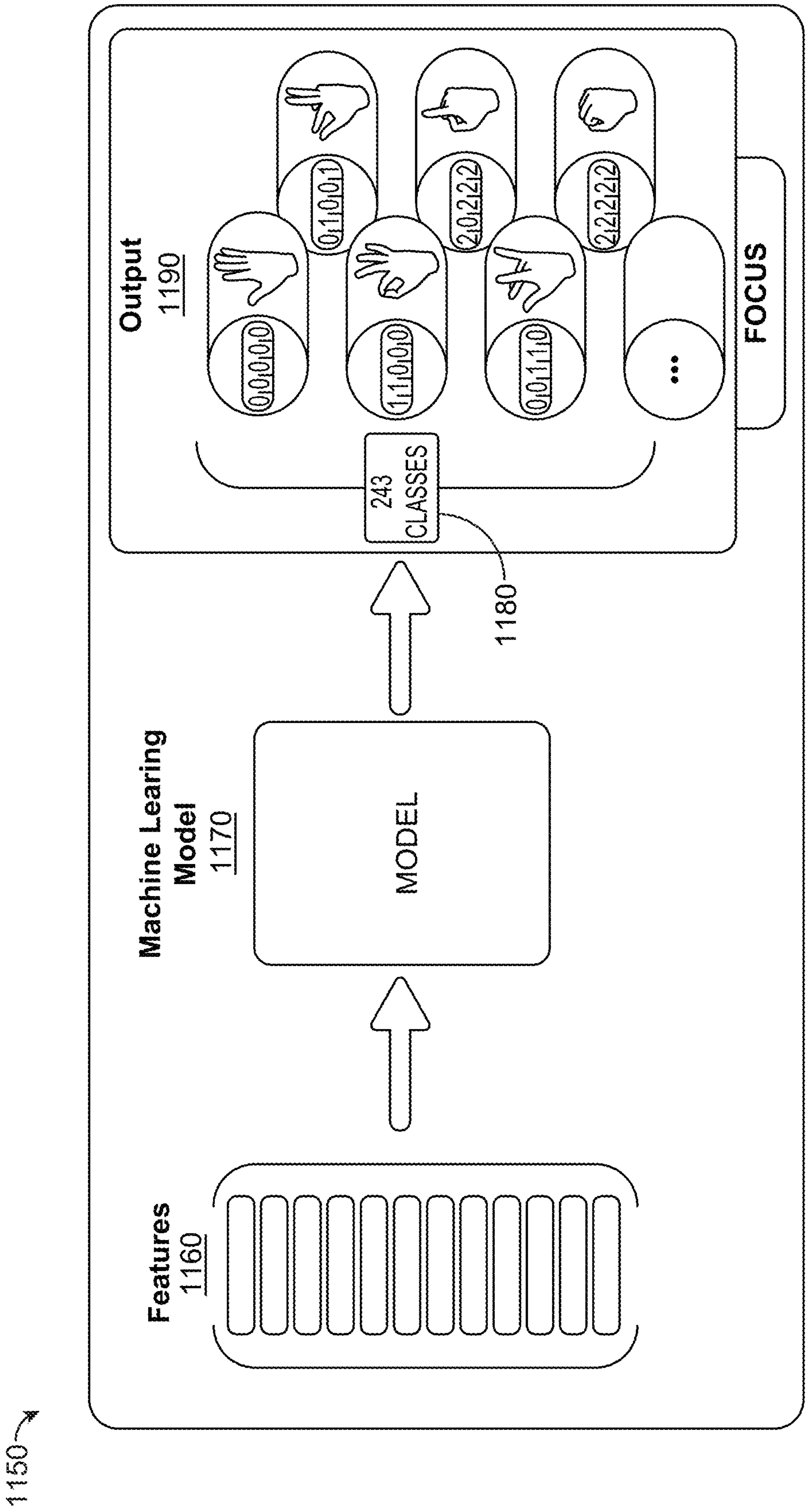
FIG. 11B is a diagram illustrating an example of a disclosed model that can classify many different hand gestures including traditional hand gestures and inter-gestures, where the model utilizes encoded finger positions, in accordance with aspects of the present disclosure.

In one or more aspects, the current state-of-the-art models for classifying hand gestures are limited to classifying traditional and, generally, manually annotated hand gestures (e.g., such as a pinch gesture, open hand gesture, or a grab gesture). Conversely, the disclosed encoding model (e.g., which encodes finger positions of the hand making the hand gesture) for classifying hand gestures can classify many hand gestures including the traditional hand gestures as well as inter-gestures and dynamic motion hand gestures. FIGS. 11A and 11B show a comparison of an example of an existing state-of-the-art model for classification of hand gestures (e.g., model 1120 of FIG. 11A) with an example of the disclosed encoding model for classification of hand gestures (e.g., model 1170 of FIG. 11B).

FIG. 11A is a diagram illustrating an example 1100 of a model 1120 that can classify only traditional hand gestures. In FIG. 11A, features 1110 are shown to be inputted into the model 1120. In one or more examples, the features 1110 may include keypoints, angles, and/or vectors of hands with different hand gestures (e.g., keypoints for ten different examples of hands making an open hand forward gesture) and manual annotations (e.g., a manual annotation of “open hand forward”) for classifications of hand gestures. The keypoints, angles, and/or vectors may be input variables (X), and the manual annotations may be the target output classifications (Y). The model 1120 may be trained based on these inputted features 1110. After the model 1120 is trained, the model 1120 can output 1140 classifications (e.g., nine classes 1130) of different hand gestures, where each classification can include a manual annotation (e.g., “open hand forward”) for a corresponding detected hand gesture.

FIG. 11B is a diagram illustrating an example 1150 of a disclosed model 1170 that can classify many different hand gestures including traditional hand gestures and inter-gestures, where the model utilizes encoded finger positions. In FIG. 11B, features 1160 are shown to be inputted into the model 1170. In one or more examples, the features 1160 may include keypoints, angles, and/or vectors of hands with different hand gestures (e.g., keypoints for ten different examples of hands making an open hand forward gesture) and codes (e.g., 0, 0, 0, 0, 0) encoding finger positions for the classifications of hand gestures. The keypoints, angles, and/or vectors may be input variables (X), and the codes may be the target output classifications (Y). The model 1170 may be trained based on these inputted features 1160. After the model 1170 is trained, the model 1170 can output 1190 classifications (e.g., $3^5$=243 classes 1180) of different hand gestures, where each classification can include a code (e.g., 0, 0, 0, 0, 0) for a corresponding detected hand gesture.

Figure 12:
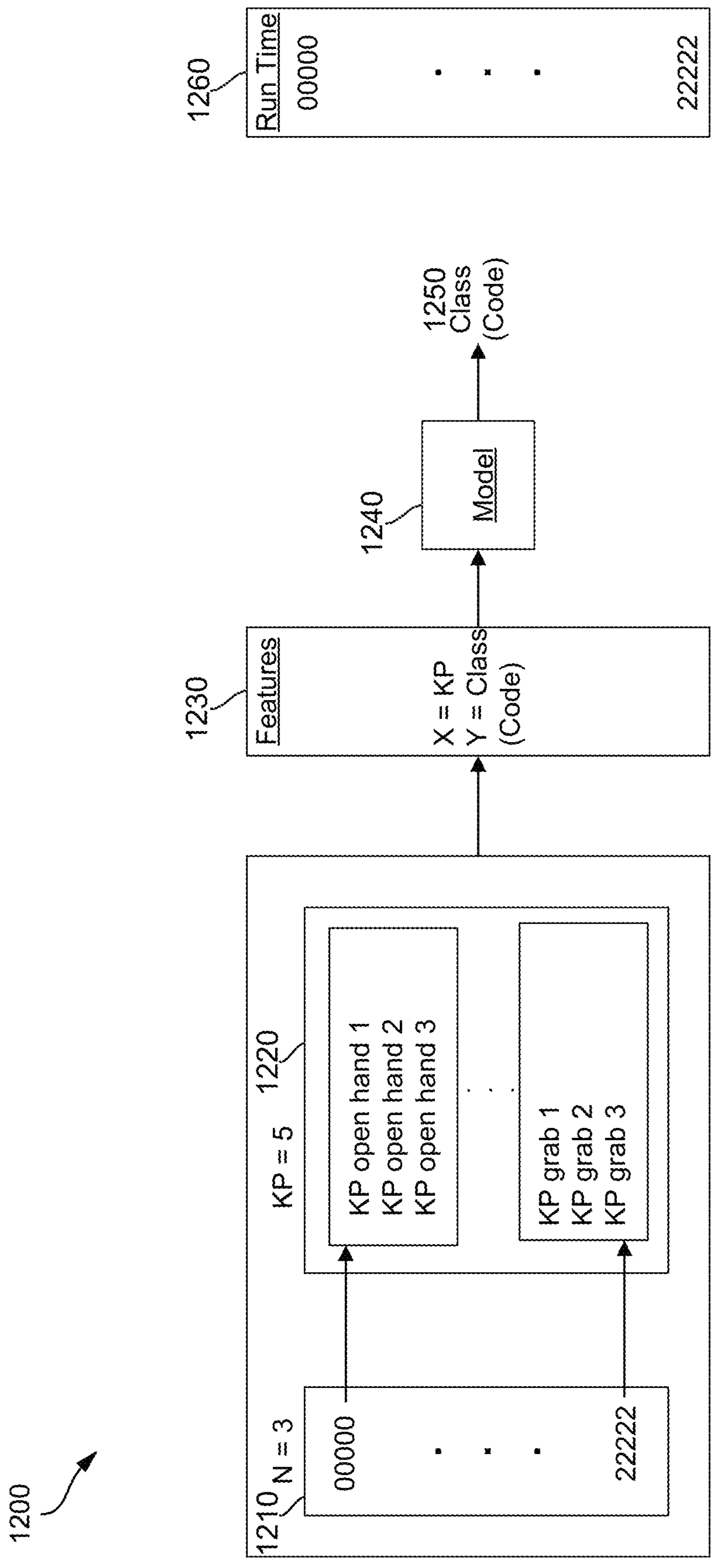
FIG. 12 is a diagram illustrating examples of details of the model of FIG. 11B, in accordance with aspects of the present disclosure.

FIG. 12 is a diagram illustrating examples 1200 of details of the model of FIG. 11B. In FIG. 12, a plurality of codes 1210 (e.g., 0, 0, 0, 0, 0) encoding finger positions for classifications of a plurality of different hand gestures (e.g., open hand forward gesture) is shown. In one or more examples, for each hand gesture, each finger may be in one of three different finger positions (e.g., N=3). In some examples, each finger may be in more or less number of finger positions than three, as is shown in FIG. 12.

Also shown in FIG. 12 are keypoints 1220 for different examples of hands making a corresponding hand gesture. For example, in FIG. 12, keypoints 1220 for three different examples of hands making a hand gesture (e.g., open hand forward gesture) with the code 0, 0, 0, 0, 0 are shown. In one or more examples, after choosing the number of iterations N (e.g., N=3), the number of classes will be equal to $N^5$ classes ($3^5$=243 classes when N=3), where 5 corresponds to the number of fingers. For each class, samples of 3D keypoints that represent a class can be generated. All samples (e.g., 3D keypoints) for all classes can be obtained, and features (e.g., features 1230) from these keypoints (e.g., features of each 3D keypoint sample is X and the class is Y) can be generated.

In FIG. 12, features 1230 including the codes 1210 and the keypoints 1220 may be inputted into the model 1240. In one or more examples, the features 1230 may include angles and/or unit vectors for different examples of hands making a corresponding hand gesture in addition to or instead of the keypoints 1220. The keypoints, angles, and/or vectors may be input variables (X), and the codes may be the target output classifications (Y).

After receiving the features 1230, the model 1240 may be trained based on the features 1230. After the model 1240 is trained, the model can output classifications 1250 (e.g., $3^5$=243 classes 1180) of different hand gestures, where each classification 1250 can include a code (e.g., 0, 0, 0, 0, 0) for a corresponding detected hand gesture.

In one or more examples, during runtime 1260 of the model 1240, different flexible gestures (e.g., flexible pinch gesture of FIG. 7) can be learned and created. For example, during runtime 1260, the model 1240 can create a flexible pinch gesture (e.g., flexible pinch gesture of FIG. 7), where the flexible pinch gesture can include a plurality of different hand gestures, including the pinch gesture 710*a* and the pincer gesture 710*f*. As such, the model 1240 can use the code 720 (e.g., 1, 1, *, *, *) to classify the flexible pinch gesture, which can include all possible transitional hand gestures from the pinch gesture 710*a* to the pincer gesture 710*f*.

Figure 13:
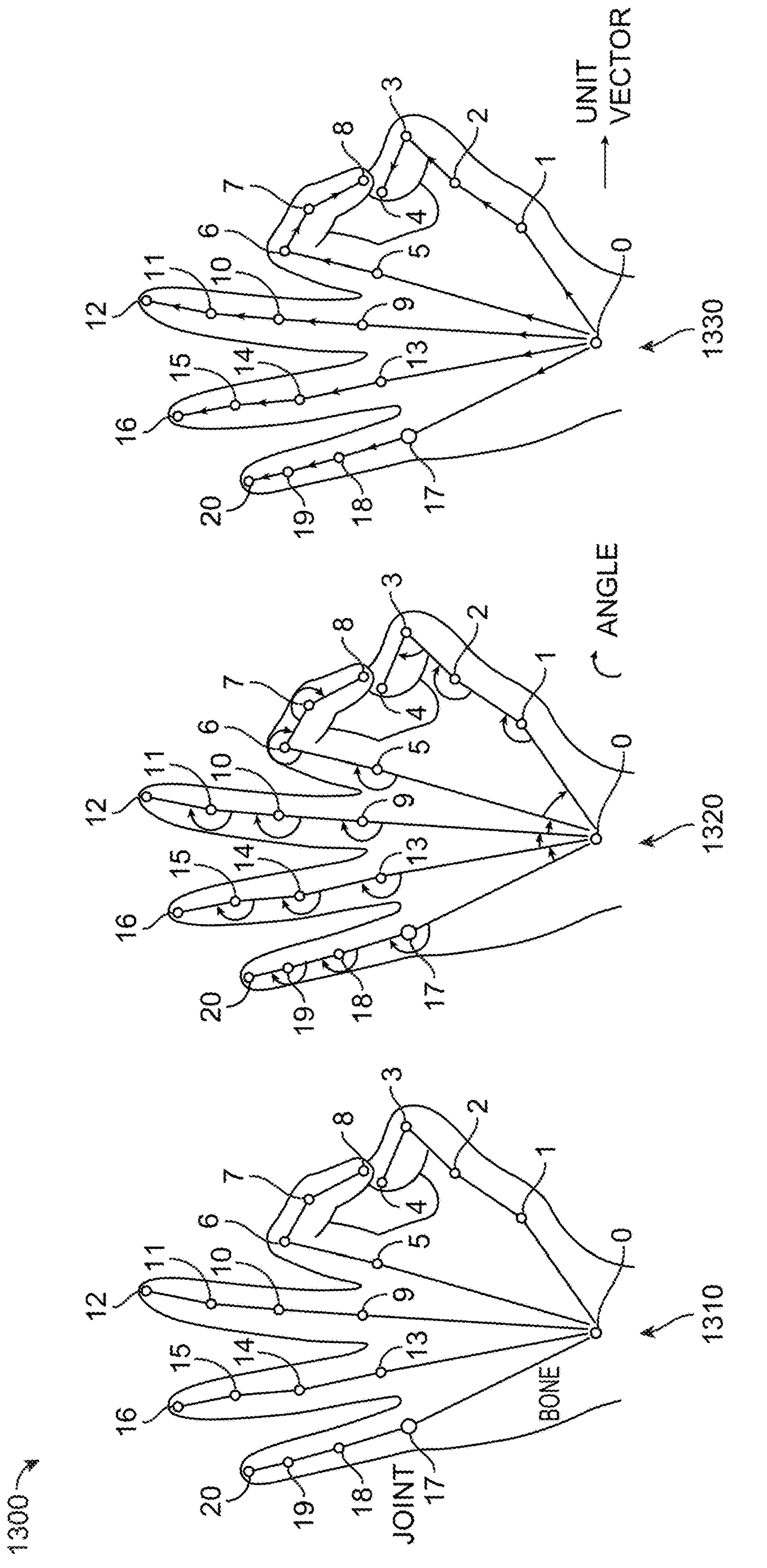
FIG. 13 is a diagram illustrating examples of keypoints for a hand, angles for a hand, and unit vectors for a hand, in accordance with aspects of the present disclosure.

As mentioned, the disclosed model can be trained based on a plurality of different hand models with keypoints (e.g., hand 1310 with associated keypoints of FIG. 13), angles (e.g., hand 1320 with associated angles of FIG. 13), and/or unit vectors (e.g., hand 1330 with associated unit vectors of FIG. 13) associated with the classification for the hand gesture. FIG. 13 is a diagram illustrating examples of keypoints for a hand, angles for a hand, and unit vectors for a hand. In FIG. 13, the hand 1310 is shown to be modeled to include 21 keypoints, the hand 1320 is shown to be modeled to include 19 angles, and the hand 1330 is shown to be modeled to include 20 unit vectors. In one or more examples, a hand may be modeled to include more or less number of keypoints than the 21 keypoints as shown in FIG. 13. In some examples, a hand may be modeled to include more or less number of angles than the 19 angles as shown in FIG. 13. In one or more examples, a hand may be modeled to include more or less number of unit vectors than the 20 unit vectors as shown in FIG. 13.

Figure 14:
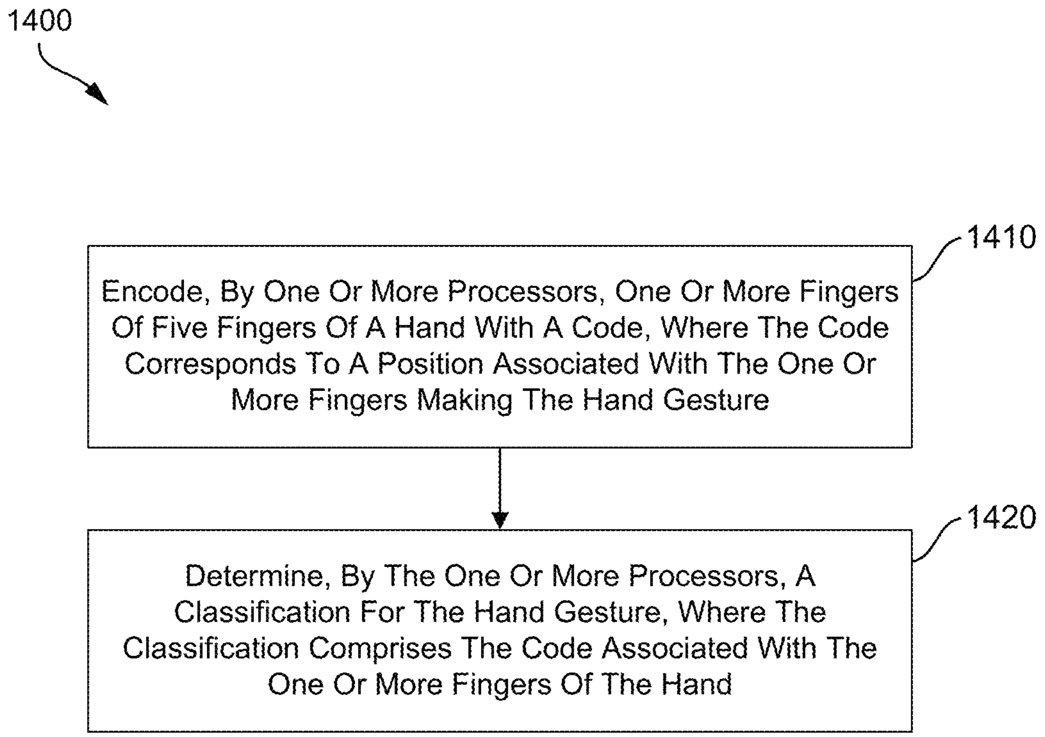
FIG. 14 is a flow diagram illustrating an example of a process for image processing, in accordance with some examples.

FIG. 14 is a flow chart illustrating an example of a process 1400 for fingers encoding based poses classification. The process 1400 can be performed by a computing device (e.g., image processing device 105B of FIG. 1, extending reality (XR) system 200 of FIG. 2, a computing device or computing system 1500 of FIG. 15) or by a component or system (e.g., a chipset, one or more processors such as one or more central processing units (CPUs), digital signal processors (DSPs), graphics processing units (GPUs), any combination thereof, and/or other type of processor(s), or other component or system) of the computing device. The operations of the process 1400 may be implemented as software components that are executed and run on one or more processors (e.g., processor 1510 of FIG. 15 or other processor(s)). Further, the transmission and reception of signals by the computing device in the process 1400 may be enabled, for example, by one or more antennas and/or one or more transceivers (e.g., wireless transceiver(s)).

At block 1410, the computing device (or component thereof) can encode one or more fingers of five fingers of a hand with a code. The code corresponds to a position associated with the one or more fingers making the hand gesture. For instance, the code can include a number for each of the one or more fingers (e.g., as shown in FIG. 6). In some aspects, the computing device (or component thereof) can receive an image of the hand making the hand gesture. The computing device (or component thereof) can determine the code corresponding to the one or more fingers of the hand based on the image (e.g., based on 3D keypoints detected in the image, as described herein).

In one illustrative example, the position includes a first finger position, a second finger position, or a third finger position. For instance, the first finger position can be an open finger position, the third finger position can be a closed finger position, and the third finger position can be between the first finger position and the second finger position (e.g., as illustrated in FIG. 8). In some cases, the hand gesture is an inter-gesture (e.g., the inter-gesture 820 of FIG. 8) that occurs in between a first hand gesture and a second hand gesture based on the hand transitioning in motion from the first hand gesture to the second hand gesture. In some aspects, the computing device (or component thereof) can determine a dynamic hand gesture (e.g., a grab motion gesture) based on occurrence of the first hand gesture, the inter-gesture, and the second hand gesture.

At block 1420, the computing device (or component thereof) can determine a classification for the hand gesture. The classification includes the code associated with the one or more fingers of the hand. In some cases, the computing device (or component thereof) can perform a function based on the classification of the hand gesture.

In some aspects, the computing device (or component thereof) can determine the classification for the hand gesture using a model. For instance, the model can be a machine learning model (e.g., a self-supervised machine learning model trained using self-supervised learning/training, such as a neural network model). In some cases, the model (e.g., the machine learning model, such as a neural network) can be trained based on a plurality of hand models with keypoints (e.g., 3D keypoints determined from the image of the hand) associated with the classification for the hand gesture.

In some cases, the computing device of process 1400 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device of process 1400 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1400 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

FIG. 15 is a block diagram illustrating an example of a computing system 1500, which may be employed for fingers encoding based poses classification. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1500 includes at least one processing unit (CPU or processor) 1510 and connection 1505 that communicatively couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500.

Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more range sensors (e.g., LIDAR sensors, laser range finders, RF radars, ultrasonic sensors, and infrared (IR) sensors) configured to collect data and provide measurements to processor 1510, whereby processor 1510 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for classifying a hand gesture, the apparatus comprising: at least one memory; and at least one processor coupled to the at least one memory and configured to: encode one or more fingers of five fingers of a hand with a code, wherein the code corresponds to a position associated with the one or more fingers making the hand gesture; and determine a classification for the hand gesture, wherein the classification comprises the code associated with the one or more fingers of the hand.

Aspect 2. The apparatus of Aspect 1, wherein the at least one processor is configured to: receive an image of the hand making the hand gesture; and determine the code corresponding to the one or more fingers of the hand based on the image.

Aspect 3. The apparatus of any of Aspects 1 or 2, wherein the at least one processor is configured to perform a function based on the classification of the hand gesture.

Aspect 4. The apparatus of any of Aspects 1 to 3, wherein the code comprises a number for each of the one or more fingers.

Aspect 5. The apparatus of any of Aspects 1 to 4, wherein the position comprises one of a first finger position, a second finger position, or a third finger position.

Aspect 6. The apparatus of Aspect 5, wherein the first finger position is an open finger position, the third finger position is a closed finger position, and the third finger position is between the first finger position and the second finger position.

Aspect 7. The apparatus of any of Aspects 1 to 6, wherein the hand gesture is an inter-gesture that occurs in between a first hand gesture and a second hand gesture based on the hand transitioning in motion from the first hand gesture to the second hand gesture.

Aspect 8. The apparatus of Aspect 7, wherein the at least one processor is configured to determine a dynamic hand gesture based on occurrence of the first hand gesture, the inter-gesture, and the second hand gesture.

Aspect 9. The apparatus of any of Aspects 1 to 8, wherein the at least one processor is configured to determine the classification for the hand gesture using a model.

Aspect 10. The apparatus of Aspect 9, wherein the model is trained based on a plurality of hand models with keypoints associated with the classification for the hand gesture.

Aspect 11. The apparatus of any of Aspects 9 or 10, wherein the model is a self-supervised machine learning model.

Aspect 12. A method for classifying a hand gesture, the method comprising: encoding, by one or more processors, one or more fingers of five fingers of a hand with a code, wherein the code corresponds to a position associated with the one or more fingers making the hand gesture; and determining, by the one or more processors, a classification for the hand gesture, wherein the classification comprises the code associated with the one or more fingers of the hand.

Aspect 13. The method of Aspect 12, wherein the at least one processor is configured to: receive an image of the hand making the hand gesture; and determine the code corresponding to the one or more fingers of the hand based on the image.

Aspect 14. The method of any of Aspects 12 or 13, wherein the at least one processor is configured to perform a function based on the classification of the hand gesture.

Aspect 15. The method of any of Aspects 12 to 14, wherein the code comprises a number for each of the one or more fingers.

Aspect 16. The method of any of Aspects 12 to 15, wherein the position comprises one of a first finger position, a second finger position, or a third finger position.

Aspect 17. The method of Aspect 16, wherein the first finger position is an open finger position, the third finger position is a closed finger position, and the third finger position is between the first finger position and the second finger position.

Aspect 18. The method of any of Aspects 12 to 17, wherein the hand gesture is an inter-gesture that occurs in between a first hand gesture and a second hand gesture based on the hand transitioning in motion from the first hand gesture to the second hand gesture.

Aspect 19. The method of Aspect 18, further comprising determining, by the one or more processors, a dynamic hand gesture based on occurrence of the first hand gesture, the inter-gesture, and the second hand gesture.

Aspect 20. The method of any of Aspects 12 to 19, further comprising determining, by the one or more processors, the classification for the hand gesture based on a model.

Aspect 21. The method of Aspect 20, wherein the model is trained based on a plurality of hand models with keypoints associated with the classification for the hand gesture.

Aspect 22. The method of any of Aspects 20 or 21, wherein the model is a self-supervised machine learning model.

Aspect 23. A non-transitory computer-readable medium having stored thereon instructions that, when executed by one or more processors, cause the one or more processors to perform operations according to any of Aspects 12 to 22.

Aspect 24. An apparatus for classifying a hand gesture, the apparatus including one or more means for performing operations according to any of Aspects 12 to 22.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for classifying a hand gesture, the apparatus comprising:

at least one memory; and at least one processor coupled to the at least one memory and configured to:

encode each finger of five fingers of a hand making the hand gesture with a respective code value corresponding to a respective position of each finger;

generate a code comprising the respective code value for each finger of the five fingers in an order corresponding to the five fingers of the hand; and determine a classification for the hand gesture based on the generated code, wherein the classification comprises the generated code associated with the five fingers of the hand.

2. The apparatus of claim 1, wherein the at least one processor is configured to:

receive an image of the hand making the hand gesture; and generate the code based on the image.

3. The apparatus of claim 1, wherein the at least one processor is configured to perform a function based on the classification of the hand gesture.

4. The apparatus of claim 1, wherein the generated code comprises a number for each finger of the five fingers.

5. The apparatus of claim 1, wherein each respective code value indicates one of a first finger position, a second finger position, or a third finger position.

6. The apparatus of claim 5, wherein the first finger position is an open finger position, the second finger position is a closed finger position, and the third finger position is between the first finger position and the second finger position.

7. The apparatus of claim 1, wherein the hand gesture is an inter-gesture that occurs in between a first hand gesture and a second hand gesture based on the hand transitioning in motion from the first hand gesture to the second hand gesture.

8. The apparatus of claim 7, wherein the at least one processor is configured to determine a dynamic hand gesture based on occurrence of the first hand gesture, the inter-gesture, and the second hand gesture.

9. The apparatus of claim 1, wherein the at least one processor is configured to determine the classification for the hand gesture using a model.

10. The apparatus of claim 9, wherein the model is trained based on a plurality of hand models with keypoints associated with the classification for the hand gesture.

11. The apparatus of claim 9, wherein the model is a self-supervised machine learning model.

12. A method for classifying a hand gesture, the method comprising:

encoding, by one or more processors, each finger of five fingers of a hand making the hand gesture with a respective code value corresponding to a respective position of each finger;

generating a code comprising the respective code value for each finger of the five fingers in an order corresponding to the five fingers of the hand; and determining, by the one or more processors, a classification for the hand gesture based on the generated code, wherein the classification comprises the generated code associated with the five fingers of the hand.

13. The method of claim 12, further comprising:

receiving an image of the hand making the hand gesture; and generating the code based on the image.

14. The method of claim 12, wherein the generated code comprises a number for each finger of the five fingers.

15. The method of claim 12, wherein each respective code value indicates one of a first finger position, a second finger position, or a third finger position, and wherein the first finger position is an open finger position, the second finger position is a closed finger position, and the third finger position is between the first finger position and the second finger position.

16. The method of claim 12, wherein the hand gesture is an inter-gesture that occurs in between a first hand gesture and a second hand gesture based on the hand transitioning in motion from the first hand gesture to the second hand gesture.

17. The method of claim 16, further comprising determining, by the one or more processors, a dynamic hand gesture based on occurrence of the first hand gesture, the inter-gesture, and the second hand gesture.

18. The method of claim 12, further comprising determining, by the one or more processors, the classification for the hand gesture based on a model.

19. The method of claim 18, wherein the model is trained based on a plurality of hand models with keypoints associated with the classification for the hand gesture.

20. The method of claim 18, wherein the model is a self-supervised machine learning model.

* * * * *